US 8,655,940 B2

(12) United States Patent
Naruse et al.

(10) Patent No.: US 8,655,940 B2
(45) Date of Patent: Feb. 18, 2014

(54) COMPUTER FOR PERFORMING INTER-PROCESS COMMUNICATION, COMPUTER-READABLE MEDIUM STORING INTER-PROCESS COMMUNICATION PROGRAM, AND INTER-PROCESS COMMUNICATION METHOD

(75) Inventors: Akira Naruse, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 12/950,614

(22) Filed: Nov. 19, 2010

(65) Prior Publication Data

US 2011/0125824 A1   May 26, 2011

(30) Foreign Application Priority Data

Nov. 20, 2009   (JP) .................................. 2009-265598

(51) Int. Cl.
*G06F 15/16* (2006.01)

(52) U.S. Cl.
USPC ........... 709/201; 718/105; 718/102; 718/104; 370/218

(58) Field of Classification Search
USPC ........................ 718/102, 104, 105; 370/218
See application file for complete search history.

(56) References Cited

U.S. PATENT DOCUMENTS

| 5,826,033 | A  | * | 10/1998 | Hayashi et al. | 709/238 |
| 5,859,981 | A  | * | 1/1999  | Levin et al.   | 709/238 |
| 6,456,838 | B1 | * | 9/2002  | Wang et al.    | 370/380 |
| 6,789,256 | B1 | * | 9/2004  | Kechriotis et al. | 719/312 |
| 7,016,971 | B1 | * | 3/2006  | Recio et al.   | 709/233 |
| 7,299,334 | B2 | * | 11/2007 | Zohar et al.   | 711/203 |
| 7,380,039 | B2 | * | 5/2008  | Miloushev et al. | 710/244 |
| 7,395,536 | B2 | * | 7/2008  | Verbeke et al. | 718/100 |
| 7,418,470 | B2 | * | 8/2008  | Howard et al.  | 709/201 |
| 7,457,303 | B2 | * | 11/2008 | Blumrich et al. | 370/406 |
| 7,533,141 | B2 | * | 5/2009  | Nadgir et al.  | 709/200 |

(Continued)

FOREIGN PATENT DOCUMENTS

JP   2009-519504   5/2009

OTHER PUBLICATIONS

Faraj, Ahmad et al., "Message Scheduling for All-to-All Personalized Communication of Ethernet Switched Clusters," Proceedings of the 19th IEEE International Parallel and Distributed Processing Symposium (IPDPS' 05), Apr. 8, 2005, pp. 1-10.

*Primary Examiner* — Ian N Moore
*Assistant Examiner* — Phong La
(74) *Attorney, Agent, or Firm* — Fujitsu Patent Center

(57) ABSTRACT

In response to an all-to-all inter-process communication request from a local process, a computer repeatedly determines a destination server in accordance with a destination-server determination procedure so that, in a same round of destination-server determinations repeatedly performed by the respective servers during all-to-all inter-process communication, the servers determine servers that are different from one another as destination servers. Each time the destination server is determined, the computer sequentially determines a process running on the determined destination server as a destination process. Each time the destination process is determined, the computer obtains transmission data for the destination process from a send buffer in which the transmission data is stored as a result of execution of the local process and transmits the obtained transmission data to the destination server so as to enable reading of the transmission data during execution of the determined destination process in the destination server.

7 Claims, 21 Drawing Sheets

(56) References Cited

U.S. PATENT DOCUMENTS

| | | | |
|---|---|---|---|
| 7,804,791 B2* | 9/2010 | Farkas et al. | 370/256 |
| 7,889,725 B2* | 2/2011 | Ajima | 370/386 |
| 8,112,658 B2* | 2/2012 | Archer et al. | 714/4.1 |
| 8,122,228 B2* | 2/2012 | Faraj | 712/28 |
| 8,209,395 B2* | 6/2012 | Richoux | 709/217 |
| 8,296,457 B2* | 10/2012 | Archer et al. | 709/238 |
| 8,325,761 B2* | 12/2012 | Howard et al. | 370/468 |
| 2004/0019890 A1* | 1/2004 | Verbeke et al. | 718/100 |
| 2005/0108518 A1* | 5/2005 | Pandya | 713/151 |
| 2006/0117208 A1* | 6/2006 | Davidson | 714/4 |
| 2006/0143350 A1* | 6/2006 | Miloushev et al. | 710/242 |
| 2007/0174558 A1* | 7/2007 | Jia et al. | 711/147 |
| 2009/0031316 A1* | 1/2009 | Richoux | 718/102 |
| 2009/0037585 A1* | 2/2009 | Miloushev et al. | 709/226 |
| 2009/0083263 A1* | 3/2009 | Felch et al. | 707/5 |
| 2009/0204981 A1* | 8/2009 | Karino et al. | 719/328 |
| 2009/0254917 A1* | 10/2009 | Ohtani | 718/104 |
| 2009/0288088 A1* | 11/2009 | Orii | 718/102 |
| 2010/0185719 A1* | 7/2010 | Howard | 709/201 |
| 2010/0325388 A1* | 12/2010 | Howard | 712/29 |
| 2011/0202682 A1* | 8/2011 | Wu et al. | 709/244 |
| 2011/0219208 A1* | 9/2011 | Asaad et al. | 712/12 |
| 2011/0225229 A1* | 9/2011 | Srivastava et al. | 709/203 |
| 2012/0020242 A1* | 1/2012 | McLaren et al. | 370/254 |

* cited by examiner

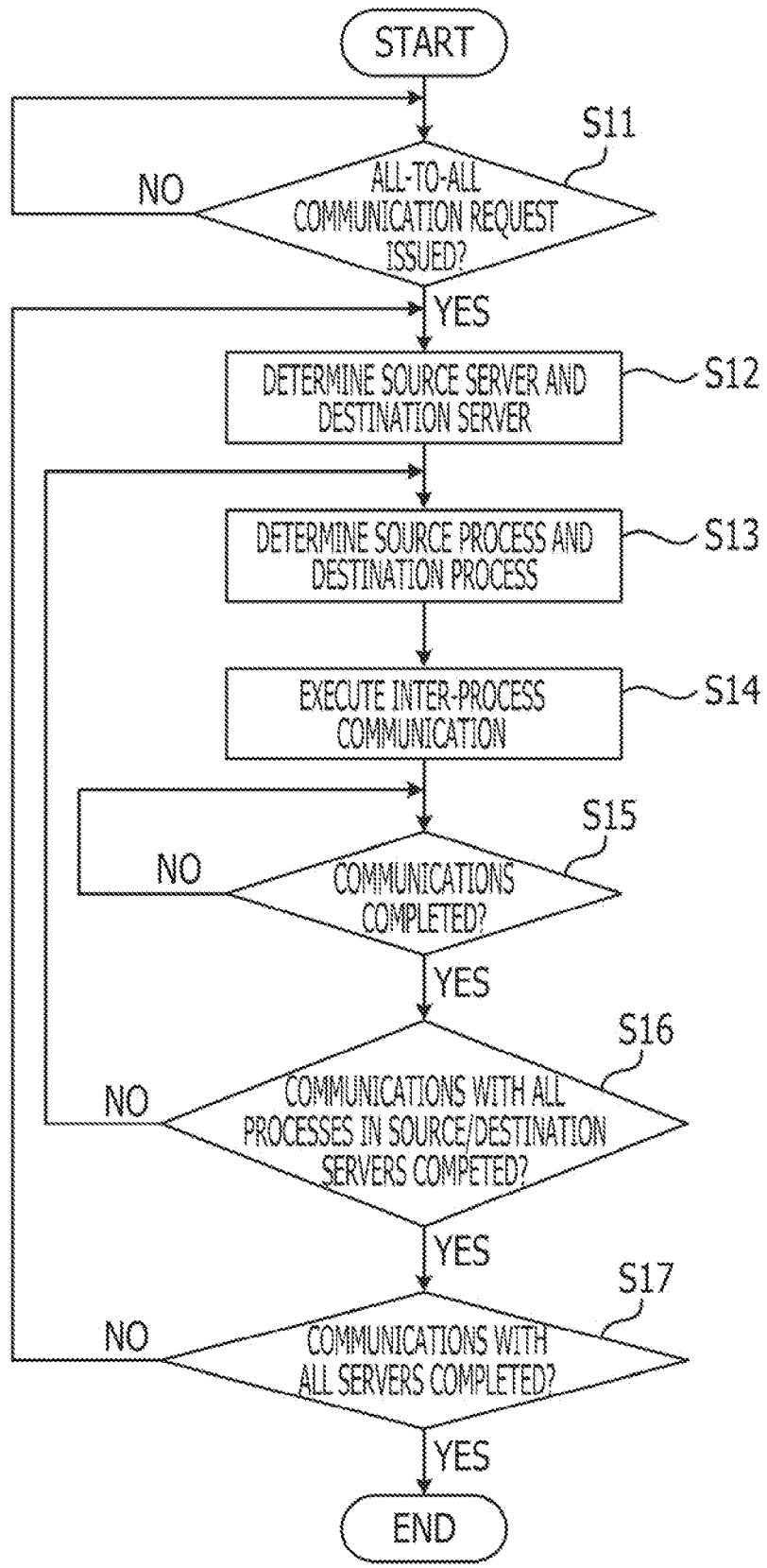

FIG. 11

| | |
|---|---|
| Ns | THE NUMBER OF SERVERS |
| Nl | THE NUMBER OF PER-SERVER PROCESSES (THE NUMBER OF PROCESSES PER SERVER) |
| Np | THE TOTAL NUMBER OF PROCESSES (Np = Ns × Nl) |
| ls | LOCAL SERVER ID (0 ≦ ls < Ns) |
| ll | LOCAL PER-SERVER PROCESS ID (0 ≦ ll < Nl) |
| lp | LOCAL PROCESS ID (lp = ls × Nl + ll) |
| ls_src | SOURCE SERVER ID |
| ls_dst | DESTINATION SERVER ID |
| lp_src | SOURCE PROCESS ID |
| lp_dst | DESTINATION PROCESS ID |

```
for ( s=0; s<Ns; s++ ){
    ls_src = (ls - s + Ns) % Ns;
    ls_dst = (ls + s + Ns) % Ns;
    for ( i=0; i<Nl; i++ ){
        lp_src = (ls_src × Nl) + ((ll - i + Nl) % Nl);
        lp_dst = (ls_dst × Nl) + ((ll + i + Nl) % Nl);
        COMMUNICATION PROCESSING (RECEPTION FROM lp_src, TRANSMISSION TO lp_dst);
    }
}
```

- DETERMINATION OF SOURCE SERVER AND DESTINATION SERVER
- DETERMINATION OF SOURCE PROCESS AND DESTINATION PROCESS

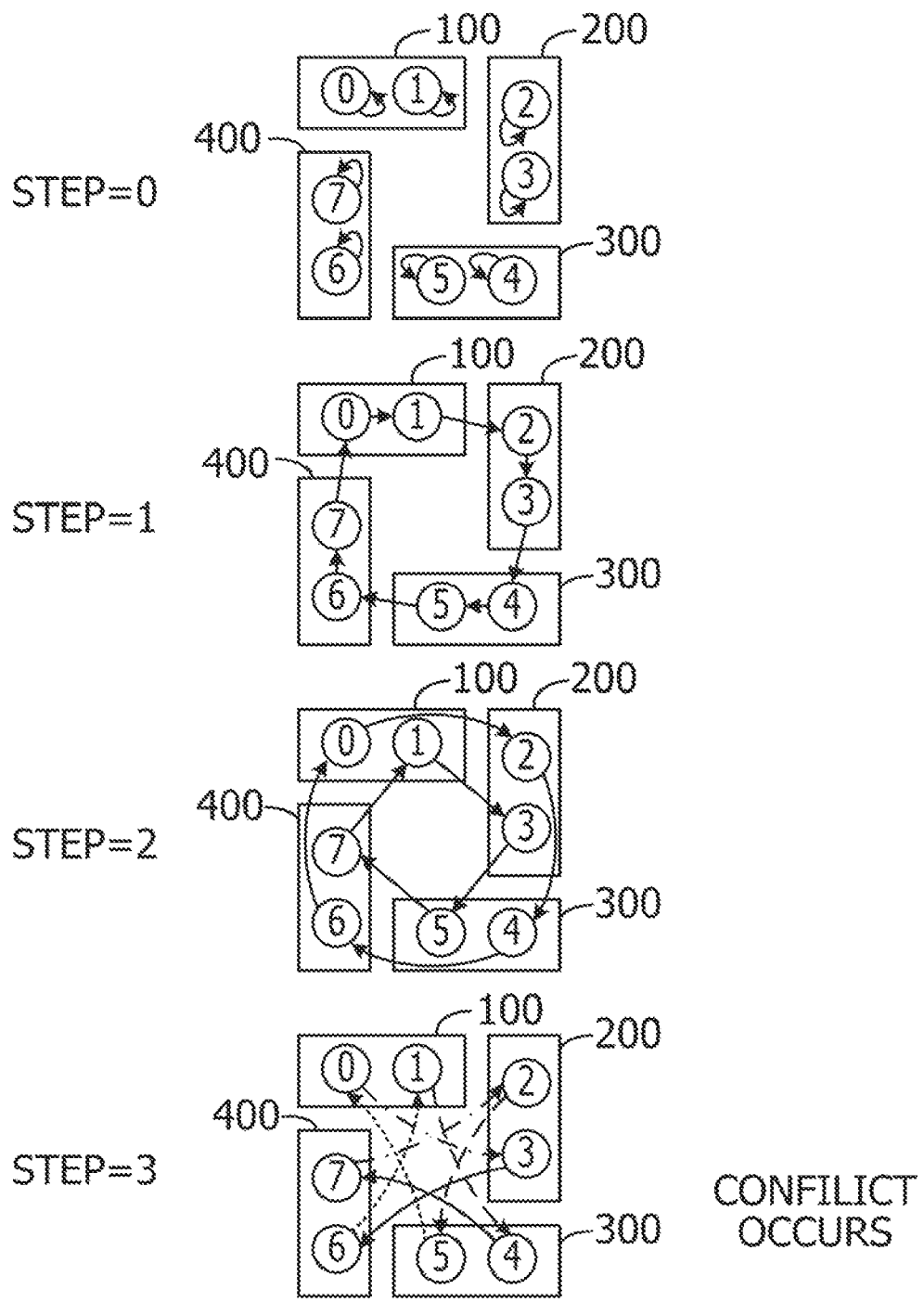

FIG. 18

| THE NUMBER OF PER-SERVER PROCESSES | 1 | 2 | 4 | 8 |
|---|---|---|---|---|
| RING | 1.79 | 1.58 | 1.55 | 1.54 |
| 2-LEVEL RING | 1.78 | 1.85 | 1.88 | 1.89 |
| (PERFORMANCE IMPROVEMENT RATE) | -0.7% | 17.2% | 21.4% | 22.5% |

[UNIT: GB/s]

- MEASUREMENT ENVIRONMENT
    - SERVER: IA SERVER (WITH 8 CORES)
    - NETWORK: DDR INFINIBAND (PEAK BAND WIDTH: 2 GB/s)
    - NUMBER OF SERVERS: 16
    - NUMBER OF PER-SERVER PROCESSES: 1, 2, 4, 8
    - INTER-PROCESS DATA TRANSMISSION/RECEPTION SIZE: 1 MB

COMPUTER FOR PERFORMING INTER-PROCESS COMMUNICATION, COMPUTER-READABLE MEDIUM STORING INTER-PROCESS COMMUNICATION PROGRAM, AND INTER-PROCESS COMMUNICATION METHOD

CROSS-REFERENCE TO RELATED APPLICATIONS

This application is based upon and claims the benefit of priority of the prior Japanese Patent Application No. 2009-265598, filed on Nov. 20, 2009, the entire contents of which are incorporated herein by reference.

FIELD

The present invention relates to a computer for performing inter-process communication through a network.

BACKGROUND

In recent years, cluster systems in which a large number of small-scale computers are coupled to execute parallel processing have been available as HPC (high performance computing) systems. In particular, a cluster system called a PC (personal computer) cluster system in which IA (Intel architecture) servers are coupled through a high-speed network is widely used.

When a parallel program is to be executed in the cluster system, processes started upon execution of the parallel program are distributed to the multiple servers for execution. Thus, when data exchange between the processes is necessary, communication between the servers is required. Accordingly, an improvement in the performance of the inter-server communication is crucial in order to improve the processing performance of the cluster system. In order to achieve high performance of the inter-server communication, it is also important to prepare a high-performance communication library, in addition to a high-performance network, including InfiniBand or Myrinet. In the cluster system, a parallel program written in the format of communication API (application program interface) called MPI (message passing interface) is executed in many cases, and various MPI communication libraries have been implemented and provided.

The type of communication between processes in the parallel program varies a great deal from one program to another, and one of the types of communication that are considered particularly important is all-to-all communication. All-to-all communication is, as the name implies, a communication pattern in which all processes send and receive data between all processes. In the MPI, an all-to-all communication function is incorporated into a function MPI_Alltoall( ).

Various communication algorithms for achieving all-to-all communication are available. Of the communication algorithms, a ring algorithm is often used when the data size is relatively large and the performance is restricted by a network's bandwidth.

As a result of increased utilization of multiple cores for processors, such as IA processors, servers included in a cluster system are typically equipped with multi-core processors. In a multi-core processor, each processor core often executes a process. For example, in a cluster system including servers each having two quad-core CPUs (a total of eight cores), it is not uncommon for eight processes to be executed per server during execution of a parallel program. The number of processes per server will hereinafter be referred to as the "number of per-server processes".

Many of currently available communication algorithms, such as the ring algorithm, are devised and implemented on the premise of a single process per server, and are not appropriate for use in a cluster system including servers equipped with multi-core processors. In practice, when effective network bandwidth is measured during all-to-all communication based on the ring algorithm using 16 servers and changing the number of per-server processes from 1, 2, 4, or 8, it may be understood that the effective network bandwidth is reduced when the number of per-server processes is large. In the case of two or more per-server processes, when all-to-all communication is performed using the ring algorithm, a conflict called HOL (head of line) blocking occurs in a network switch. This causes a reduction in the effective network bandwidth. HOL blocking is a phenomenon that occurs when packets are simultaneously transferred from multiple input ports to the same output port and that causes a packet-transfer delay due to contending for a buffer in the output port.

Thus, the known all-to-all inter-process communication algorithm is not appropriate for a cluster system including servers that each execute multiple processes. As a result, when the known algorithm is used to perform inter-process communication in such a cluster system, the performance of the entire system may not be fully exploited.

SUMMARY

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

A computer executes communication between processes executed by servers included in a cluster system; the computer is one of the servers. The computer repeatedly determines, in response to an all-to-all inter-process communication request from a local process executed by the computer, a destination server in accordance with a destination-server determination procedure predefined so that, in a same round of destination-server determinations repeatedly performed by the respective servers during all-to-all inter-process communication, the servers determine servers that are different from one another as destination servers. Each time the destination server is determined, the computer sequentially determines a process running on the determined destination server as a destination process. Each time the destination process is determined, the computer obtains transmission data for the destination process from a send buffer in which the transmission data is stored as a result of execution of the local process and transmits the obtained transmission data to the destination server so as to enable reading of the transmission data during execution of the determined destination process in the destination server.

BRIEF DESCRIPTION OF THE DRAWINGS

Embodiments are illustrated by way of example and not limited by the following figures.

FIG. 10 is a flowchart of a procedure of all-to-all communication processing;

FIG. 11 illustrates an example of a processing description for making a process determination based on a 2-level ring algorithm according to a second embodiment;

FIG. 12 is a first drawing illustrating changes in the state of inter-process communication based on a ring algorithm;

FIG. 18 illustrates results of measurement of effective network bandwidths for the 2-level ring algorithm and the ring algorithm;

DESCRIPTION OF EMBODIMENTS

Embodiments will be described below with reference to the accompanying drawings.

First Embodiment

Figure 1:
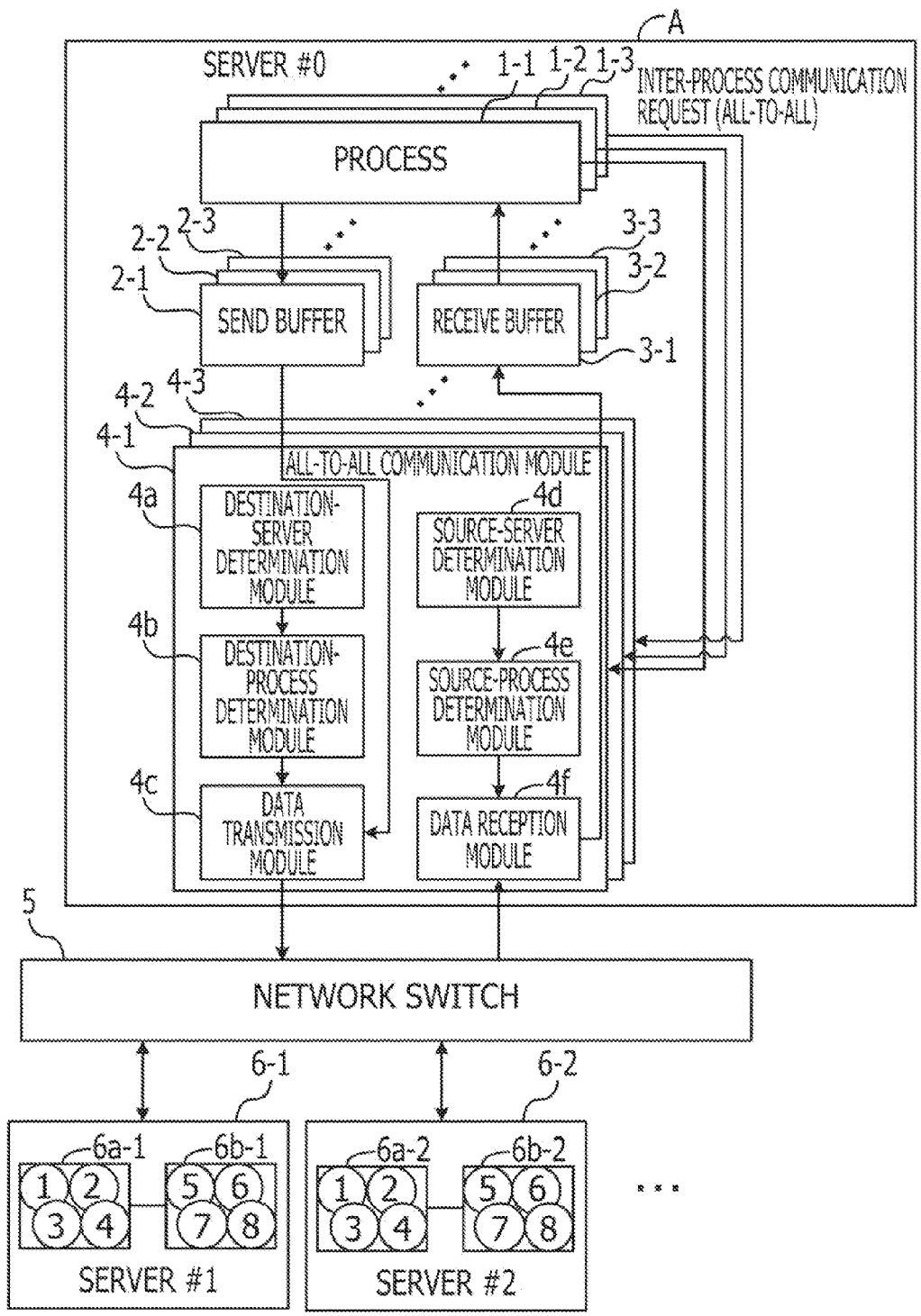
FIG. 1 is a block diagram of functions according to a first embodiment.

FIG. 1 is a block diagram of functions according to a first embodiment. A computer A functions as one of multiple servers included in a cluster system. Multiple servers 6-1, 6-2, and so forth (annotated from here onwards by ellipsis points "..."), and the computer A are coupled via a network switch 5 to operate as a cluster system. The computer A and the servers 6-1, 6-2, ... perform communication between the respective executed processes.

Multiple processes 1-1, 1-2, 1-3, ... are running on the computer A. Similarly, multiple processes are running on each of the servers 6-1, 6-2, .... The server 6-1 includes processors 6a-1 and 6b-1 and the server 6-2 includes processors 6a-2 and 6b-2. Each of the processors 6a-1, 6b-1, 6a-2, and 6b-2 has multiple processor cores, each of which executes a corresponding process. In the example in FIG. 1, processes in the servers 6-1, 6-2, ... are denoted by circles.

Thus, multiple processes are running on each of the computer A and the servers 6-1, 6-2, ..., and each process executes calculation processing to be executed in the cluster system. When predetermined calculation processing is completed, each process performs data transmission/reception through inter-process communication. One type of inter-process communication is all-to-all communication.

The processes 1-1, 1-2, 1-3, ... in the computer A exchange data with each other via send buffers 2-1, 2-2, 2-3, ... and receive buffers 3-1, 3-2, 3-3, ..., respectively. The send buffers 2-1, 2-2, 2-3, ... and the receive buffers 3-1, 3-2, 3-3, ... are, for example, parts of a storage area in a primary storage device in the computer A.

When all-to-all communication is be executed, the computer A executes the processes 1-1, 1-2, 1-3, ... so that data to be transmitted are stored in the send buffers 2-1, 2-2, 2-3, ... (buffers used during the calculation processing may also be directly used as the send buffers). Thereafter, the processes 1-1, 1-2, 1-3, ... issue all-to-all inter-process communication requests.

When the all-to-all inter-process communication requests are issued from the processes 1-1, 1-2, 1-3, ..., all-to-all communication modules 4-1, 4-2, 4-3, ..., corresponding to the respective processes 1-1, 1-2, 1-3, ..., are started. The all-to-all communication modules 4-1, 4-2, 4-3, ... transmit the data, output from the corresponding processes 1-1, 1-2, 1-3, ..., to other processes and also pass data, received from other processes, to the processes 1-1, 1-2, 1-3, ..., respectively. The all-to-all communication modules 4-1, 4-2, 4-3, ... have the same function. Functions of the all-to-all communication module 4-1 will be described below in detail by way of example.

The all-to-all communication module 4-1 has a destination-server determination module 4a, a destination-process determination module 4b, a data transmission module 4c, a source-server determination module 4d, a source-process determination module 4e, and a data reception module 4f.

In response to the all-to-all inter-process communication request issued from the local process (the process 1-1) executed by the computer A, the destination-server determination module 4a repeatedly determines a destination server in accordance with a predefined destination-server determination procedure. The destination-server determination procedure is defined so that, in the same round of destination-server determinations repeatedly performed by the multiple servers during all-to-all inter-process communication, the multiple servers determine servers that are different from one another as destination servers.

For example, the destination-server determination procedure is defined so that server numbers assigned to the respective servers are arranged according to a predetermined sequence and a destination server is determined, based on the sequence of a relative positional relationship between the server number assigned to the computer A and another server number. According to such a destination-server determination procedure, even when the computer A and the servers 6-1, 6-2, ... determine destination servers in accordance with the same destination-server determination procedure, servers that are different from one another may be determined as the destination servers in the same round of the destination-server determinations. The server numbers of the computer A and the servers 6-1, 6-2, ... are different from one another. Thus, when a relative positional relationship on the sequence relative to the local server number is determined, the positions of different server numbers are located. As a result, the computer A and the servers 6-1, 6-2, ... may determine servers that are different from one another as the destination servers. When the destination-server determination procedure using the local server number as a reference is employed, the all-to-all communication modules 4-1, 4-2, 4-3, . . . in one computer A determine the same server as their destination servers in the same round of the destination-server determinations.

As the destination-server determination procedure for determining the destination server based on the sequence of a relative positional relationship between the server number assigned to the computer A and another server number, a technology in which server numbers are arranged in a ring for example, is available. More specifically, the server numbers assigned to the respective servers are arranged in ascending order to create a sequence in which a largest value of the server numbers is followed by a smallest value of the server numbers. The destination-server determination procedure defines that the server number is sequentially located in a certain direction along the sequence from the server number assigned to the computer A, and the server indicated by the located server number is determined as the destination server.

Each time the destination server is determined, the destination-process determination module 4b sequentially determines, as a destination process, a process that is running on the determined destination server. For example, in accordance with a predefined destination-process determination procedure, the destination-process determination module 4b repeatedly determines a destination process for the local process (i.e., the process 1-1) that issued the all-to-all inter-process communication request. In the destination-process determination procedure, destination-process determinations for the respective processes 1-1, 1-2, 1-3, . . . are repeatedly performed. The destination-process determination procedure is defined so that, in the same round of the destination-process determinations, processes that are different from one another in the destination server are determined as destination processes with respect to the processor processes 1-1, 1-2, 1-3, . . . . The destination processes determinations with respect to the processes 1-1, 1-2, 1-3, . . . are made in response to the all-to-all inter-process communication requests issued from the processes 1-1, 1-2, 1-3, . . . , respectively.

For example, the destination-process determination procedure defines that process numbers assigned to the respective processes are arranged according to a predetermined sequence. In addition, the destination-process determination procedures is defined so that the destination processes are determined based on the sequence of a relative positional relationship between the process number assigned to the local process (the process 1-1) that issued the all-to-all inter-process communication request and the process number of another process. According to such a destination-process determination procedure, even when the all-to-all communication modules 4-1, 4-2, 4-3, . . . determine destination processes in accordance with the same destination-process determination procedure, processes that are different from one another may be determined as the destination processes in the same round of the destination-process determinations. That is, since the process numbers of the local processes for the all-to-all communication modules 4-1, 4-2, 4-3, . . . are different from one another, the positions of the processes numbers that are different from one another are located when relative positional relationships on the sequences using the respective process numbers as references are identified. As a result, the all-to-all communication modules 4-1, 4-2, 4-3 . . . may determine destination processes that are different from one another.

As the destination-process determination procedure for determining the destination process based on the sequence of a relative positional relationship between the process number of a local process and the process number of another process, a technology in which process numbers are arranged in a ring for example, is available. More specifically, per-server process numbers that uniquely identify processes in each destination server are assigned to the processes in the destination server and are arranged in ascending order to create a sequence in which a largest value of the per-server process numbers is followed by a smallest value of the per-server process numbers. The destination-process determination procedure defines that the process number is sequentially located in a certain direction along the sequence from the process number assigned to the local process and the process included in the destination server and indicated by the located process number is determined as the destination process.

Each time the destination process is determined, the data transmission module 4c obtains, from the send buffer 2-1 in which data to be transmitted is stored by the local process, transmission data corresponding to the destination process. The data transmission module 4c then transmits the obtained transmission data to the destination server so as to enable reading of the transmission data during execution of the determined destination process in the destination server.

In response to the all-to-all inter-process communication request issued from the local process (the process 1-1) executed by the computer A, the source-server determination module 4d repeatedly determines a source server in accordance with a predefined source-server determination procedure. The source-server determination procedure is defined so that, in the same round of source-server determinations repeatedly performed by the multiple servers during all-to-all inter-process communication, the multiple servers determine servers that are different from one another as source servers.

Each time the source server is determined, the source-process determination module 4e sequentially determines, as a source process, a process that is running on the determined source server.

Each time the source process is determined, the data reception module 4f obtains reception data transmitted from the source process determined in the source server and stores the obtained reception data in the receive buffer 3-1.

Communication modules that are similar to the all-to-all communication modules 4-1, 4-2, 4-3, . . . are also provided in the other servers 6-1, 6-2, . . . . When the processes in the cluster system start all-to-all inter-process communication, servers that are different from one another are determined as destination servers with respect to processes in the different servers in the same round of destination-server determinations performed on the respective processes. Next, processes in the destination server are determined as destination processes to which data of the respective processes are to be transmitted. Data output from each process is transmitted to the destination process determined for the process.

As described above, since different servers are determined as destination servers in the same round of destination-server determinations for the respective processes executed by the different servers, a conflict for an output port is suppressed during transfer of the sent data via the network switch 5. When no conflict for an output port occurs, the occurrence of HOL (head of line) blocking is also suppressed and the processing efficiency of the all-to-all inter-process communication improves.

The reason why each of the all-to-all communication modules 4-1, 4-2, 4-3, . . . determines not only a destination process but also a source process, is to reserve a buffer in the corresponding data reception module 4f so as to allow immediate reception of data transmitted from the source process. That is, upon determination of a source process, the data reception module 4f reserves a buffer for preferentially obtaining data transmitted from the determined source process. With this arrangement, when another inter-computer communication occurs and other data transmitted from the source process is to be received, the data reception module 4f may immediately receive the data and may store the data in the receive buffer provided for the process. Consequently, it is possible to improve the processing efficiency of the all-to-all inter-process communication.

Second Embodiment

Details of a second embodiment will be described next. In the second embodiment, the process number of each process may be determined from the server number of a server that executes the process and a per-server process number of the process in the server, thereby facilitating determination of the source and destination processes. In the second embodiment, the server number is referred to as a server ID (identifier) and the process number is referred to as a process ID.

Figure 2:
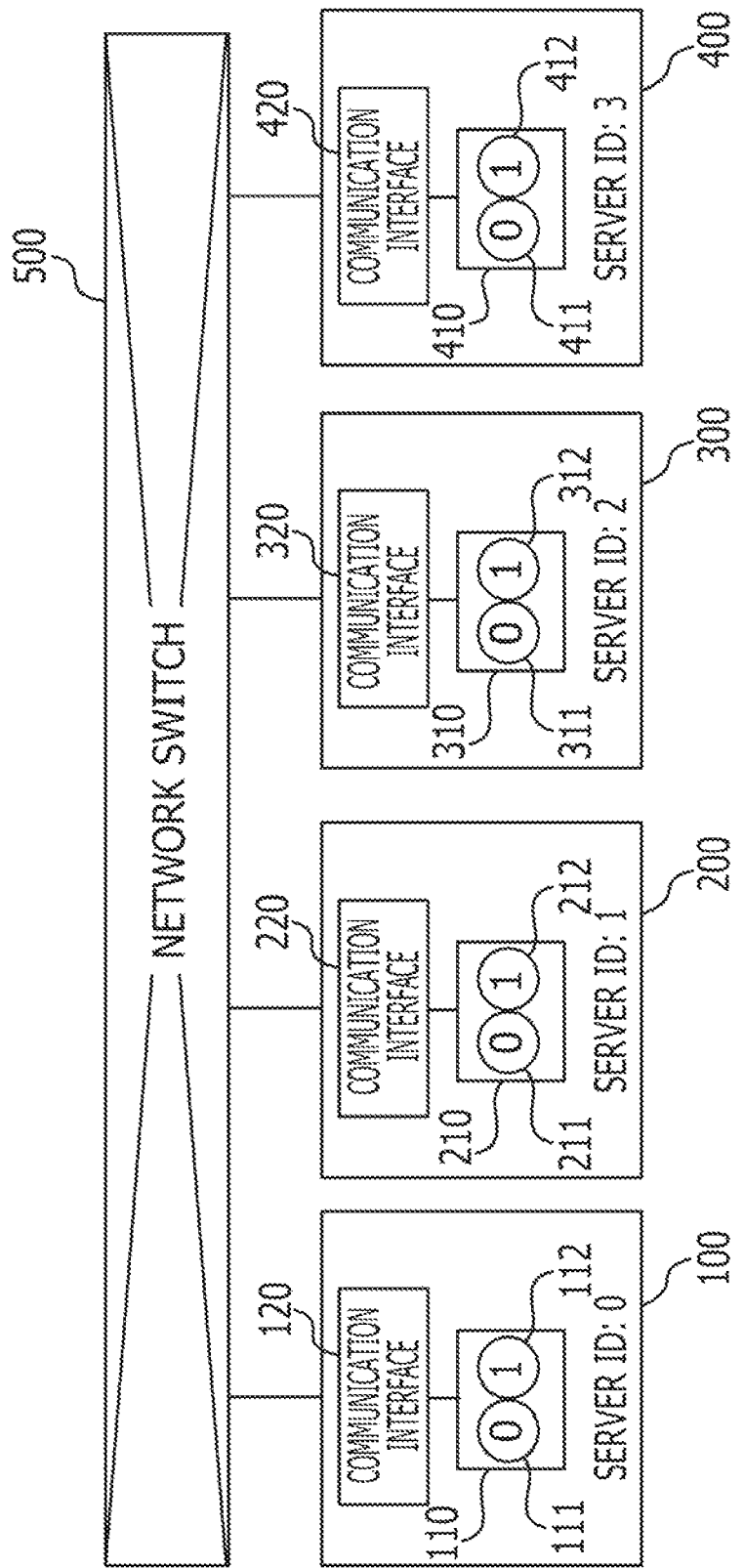
FIG. 2 is a block diagram of an example of a system configuration according to the present embodiment.

FIG. 2 illustrates an example of a system configuration according to the present embodiment. In a cluster system according to the present embodiment, multiple servers 100, 200, 300, and 400 are coupled via a network switch 500.

The servers 100, 200, 300, and 400 have processors 110, 210, 310, and 410, and communication interfaces 120, 220, 320, and 420, respectively. The processor 110 has multiple processor cores 111 and 112. Similarly, the processor 210 has multiple processor cores 211 and 212, the processor 310 has multiple processor cores 311 and 312, and the processor 410 has multiple processor cores 411 and 412.

The servers 100, 200, 300, and 400 are assigned server IDs. The server ID of the server 100 is "0", the server ID of the server 200 is "1", the server ID of the server 300 is "2", and the server ID of the server 400 is "3".

The processes executed by the processor cores included in the processor in each of the servers 100, 200, 300, and 400 are also assigned per-server process IDs in the corresponding server. In FIG. 2, the per-server process IDs of the processes executed by the corresponding processor cores are illustrated in circles representing the processor cores.

A process ID for uniquely identifying a process in the cluster system is also defined for each process. In the second embodiment, the server ID of the server that executes the process is multiplexed by the number of per-server processes (i.e., the number of processes per server), the value of the per-server process ID is added to the result of the multiplication, and the result of the addition is used as the process ID.

The hardware configurations of the servers 100, 200, 300, and 400 will be described next.

Figure 3:
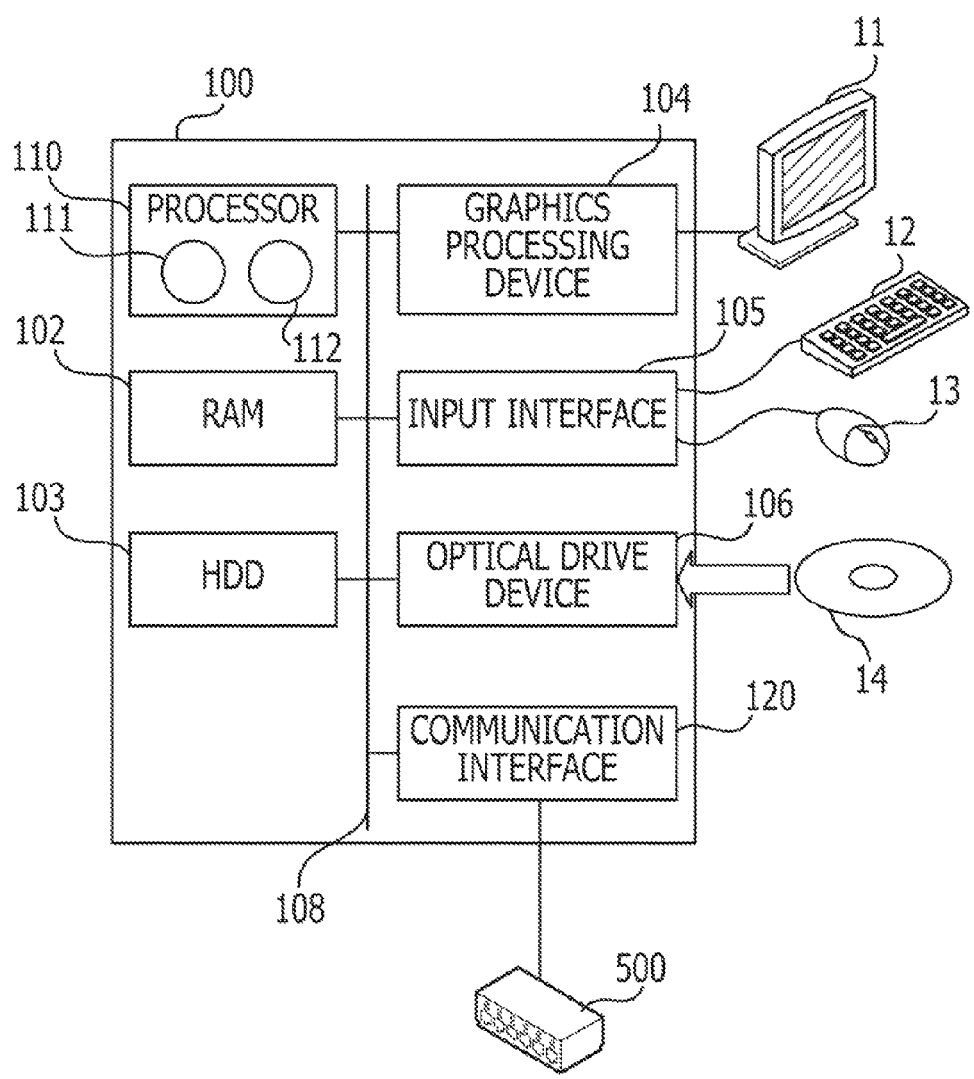
FIG. 3 is a block diagram of an example of the hardware configuration of a computer used in the present embodiment.

FIG. 3 is a block diagram of an example of the hardware configuration of the computer for use in the present embodiment. The entire apparatus of the server 100 is controlled by the processor 110 having the processor cores 111 and 112. A RAM (random access memory) 102 and multiple peripherals are coupled to the processor 110 through a bus 108.

The RAM 102 is used as a primary storage device for the server 100. The RAM 102 temporarily stores at least part of an OS (operating system) program and application programs to be executed by the processor 110. The RAM 102 stores various types of data needed for processing to be executed by the processor 110.

Examples of the peripherals coupled to the bus 108 include a HDD (hard disk drive) 103, a graphics processing device 104, an input interface 105, an optical drive device 106, and a communication interface 120.

The HDD 103 magnetically writes/reads data to/from its built-in disk. The HDD 103 is used as a secondary storage device for the server 100. The HDD 103 stores the OS program, application programs, and various types of data. The secondary storage device may also be implemented by a semiconductor storage device, such as a flash memory.

A monitor 11 is coupled to the graphics processing device 104. In accordance with an instruction issued from the processor 110, the graphics processing device 104 displays an image on a screen of the monitor 11. The monitor 11 may be implemented by a liquid crystal display device, a display device using a CRT (cathode ray tube), or the like.

A keyboard 12 and a mouse 13 are coupled to the input interface 105. The input interface 105 sends signals, sent from the keyboard 12 and the mouse 13, to the processor 110. The mouse 13 is one example of a pointing device and may be implemented by another pointing device. Examples of another pointing device include a touch panel, a graphics tablet, a touchpad, and a trackball.

The optical drive device 106 uses laser light or the like to read data recorded on an optical disk 14. The optical disk 14 is a portable recording medium to which data is recorded so as to be readable via light reflection. Examples of the optical disk 14 include a DVD (Digital Versatile Disc), a DVD-RAM, a CD-ROM (Compact Disc-Read Only Memory), and a CD-R (Recordable)/RW (ReWritable).

The communication interface 120 is coupled to the network switch 500. The communication interface 120 transmits/receives data to/from the other servers 200, 300, and 400 via the network switch 500.

A hardware configuration as described may achieve a processing function according to the present embodiment. Although FIG. 3 illustrates the hardware configuration of the server 100, the other servers 200, 300, and 400 may also be achieved with a similar hardware configuration.

In the servers 100, 200, 300, and 400 having a configuration as described above, a process is generated for each processor core. The processor core for which the process is generated executes computation processing. For performing large-scale computation, the computation processing is split into multiple processing operations, which are allocated to respective processes. The processor cores execute the processes to execute the allocated computation processing operations in parallel. The processor cores that execute the processes communicate with each other to exchange computation results with the processor cores that execute other processes. During such data exchange, all-to-all communication may be performed. In the all-to-all communication, the processor cores that execute the processes communicate with the processor cores that execute all other processes.

Figure 4:
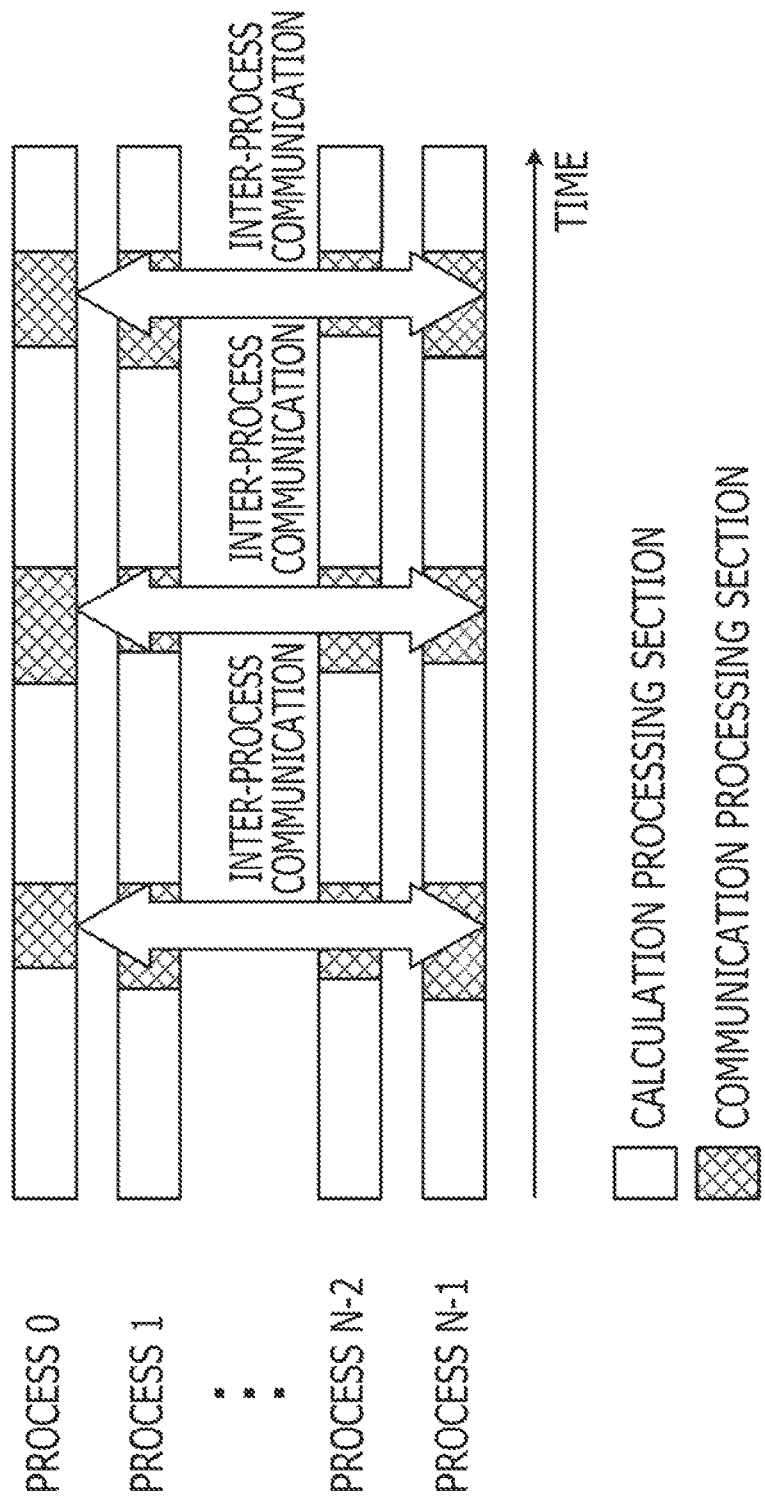
FIG. 4 illustrates an overview of the parallel program behavior.

FIG. 4 illustrates an overview of a typical parallel program behavior. More specifically, FIG. 4 illustrates an example of a state in which the processing operations of N processes (N is a natural number of 1 or greater) change over time when a parallel program is executed on cluster system. A hollow section in each process represents a time slot in which calculation processing is executed. A hatched section in each process represents a time slot in which communication processing is executed.

Upon completing calculation processing for a given calculation section, the processor core that executes the corresponding process summons a function for all-to-all communication with other processes when all-to-all communication is required at communication section. For example, an MPI (message passing interface) function for all-to-all communication is read.

Of the all-to-all inter-process communication, communication with processes belonging to a different server is executed via the network switch 500. In the network switch 500, when data output from multiple communication ports are simultaneously input to another communication port, HOL blocking occurs. A state in which HOL blocking occurs will be described below with reference to FIGS. 5 to 7.

Figure 5:
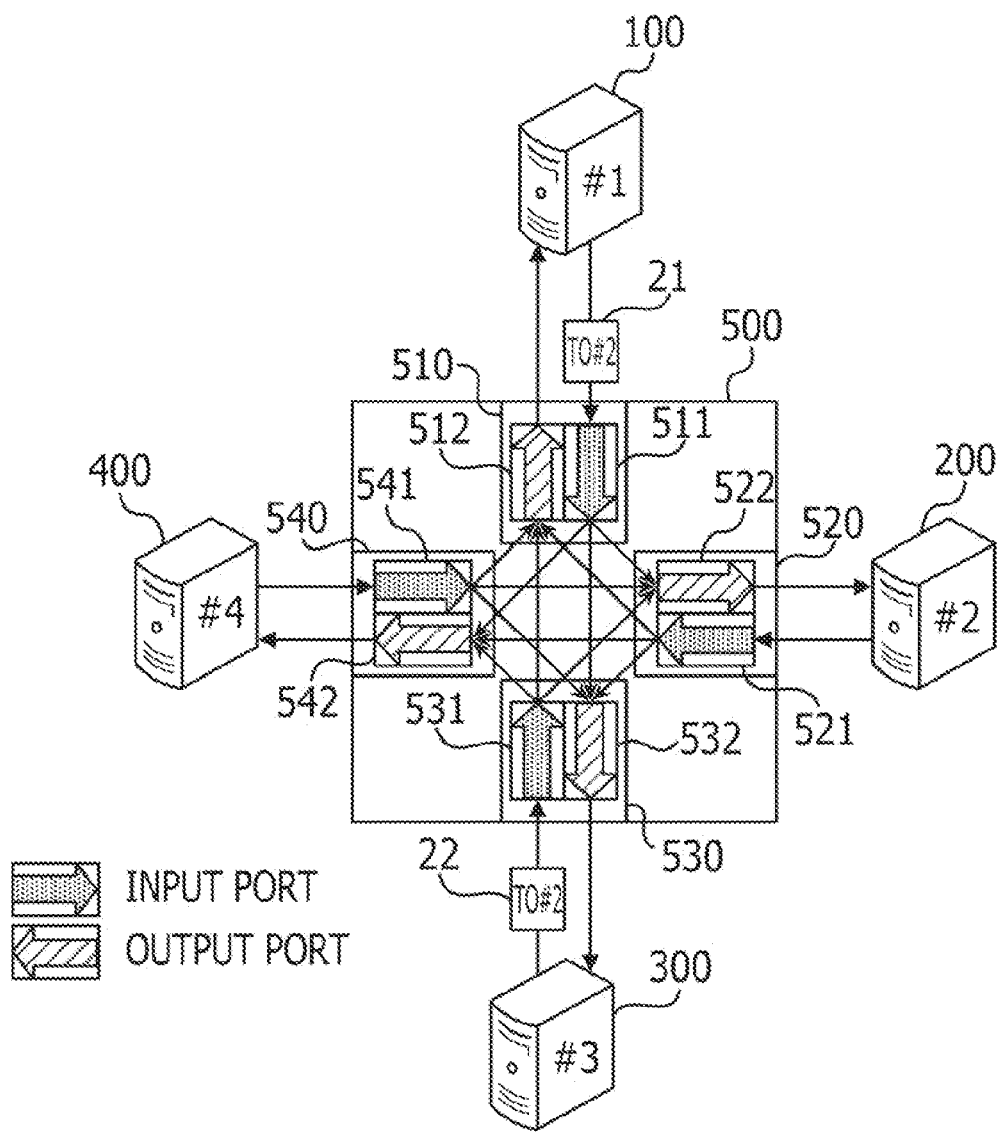
FIG. 5 illustrates communication paths in a network switch.

FIG. 5 illustrates communication paths in the network switch. More specifically, FIG. 5 illustrates communication paths among communication ports 510, 520, 530, and 540 coupled correspondingly to four servers 100, 200, 300, and 400 in the network switch 500. The servers 100, 200, 300, and 400 are coupled to the communication ports 510, 520, 530, and 540, respectively.

The communication ports 510, 520, 530, and 540 in the network switch 500 have input ports 511, 521, 531, and 541, and output ports 512, 522, 532, and 542, respectively. Packets transmitted from the coupled servers to the other servers are input to the input ports 511, 521, 531, and 541. Packets transmitted from the other servers to the coupled servers are output from the output ports 512, 522, 532, and 542. The input ports 511, 521, 531, and 541 have corresponding buffers therein. The buffers in the input ports 511, 521, 531, and 541 may temporarily store the input packets. Similarly, the output ports 512, 522, 532, and 542 have corresponding buffers therein. The buffers in the output ports 512, 522, 532, and 542 may temporarily store the packets to be output.

The input port 511 of the communication port 510 has communication paths coupled to the output ports 522, 532, and 542 of the other communication ports 520, 530, and 540. The input port 521 of the communication port 520 has communication paths coupled to the output ports 512, 532, and 542 of the other communication ports 510, 530, and 540. The input port 531 of the communication port 530 has communication paths coupled to the output ports 512, 522, and 542 of the other communication ports 510, 520, and 540. The input port 541 of the communication port 540 has communication paths coupled to the output ports 512, 522, and 532 of the other communication ports 510, 520, and 530.

When all processor cores that execute the processes in the cluster system start all-to-all communication, communication occurs via the network switch 500. A description will now be given of an example in which packets 21 and 22 destined for the server 200 are simultaneously transmitted from two servers 100 and 300, respectively. The packets 21 and 22 transmitted from the servers 100 and 300 are input to the input ports 511 and 531, respectively, in the network switch 500.

Figure 6:
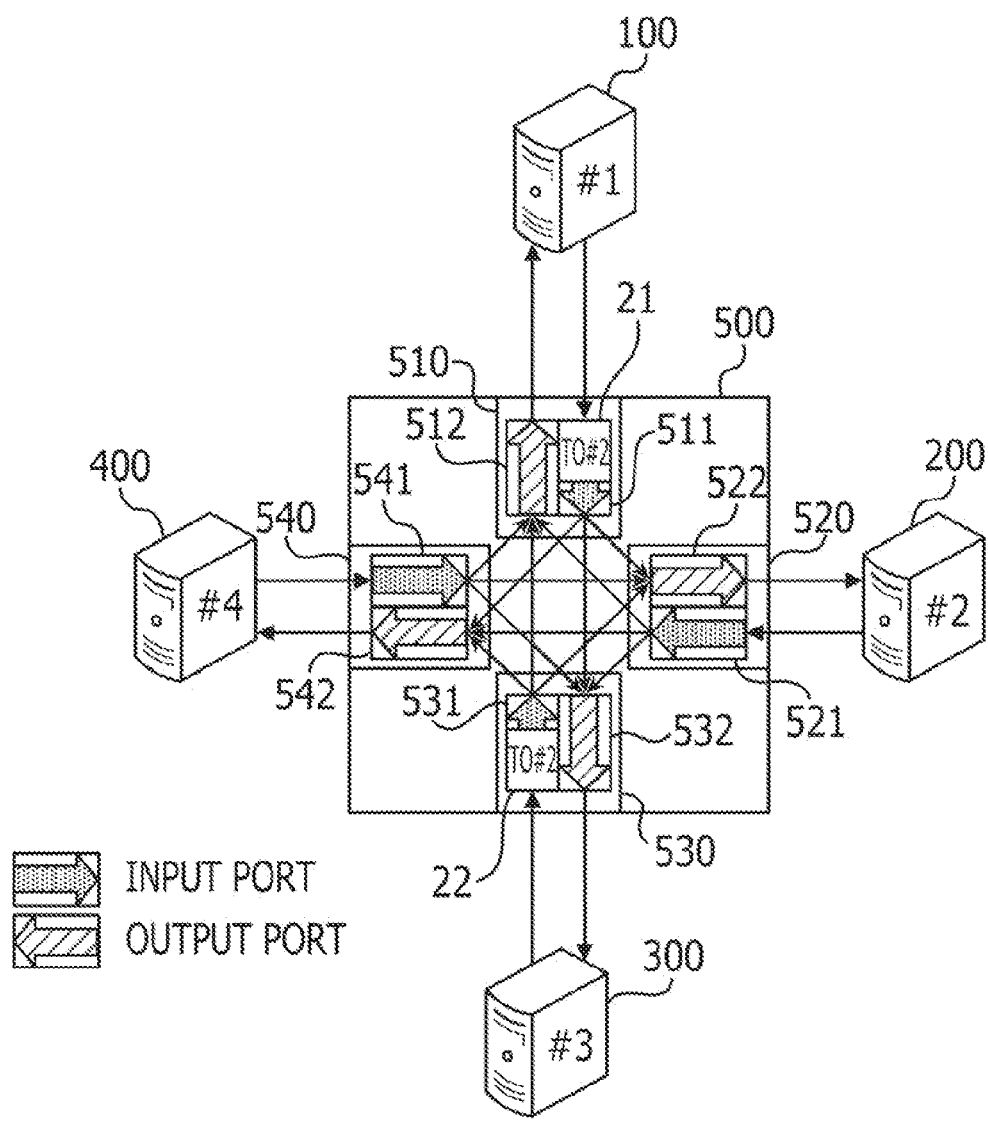
FIG. 6 illustrates a state in which packets are received in the network switch.

FIG. 6 illustrates a state in which the packets are received in the network switch. The packet 21 transmitted from the server 100 is stored in the buffer in the input port 511 of the network switch 500. The packet 22 transmitted from the server 300 is stored in the buffer in the input port 531 of the network switch 500. On the basis of the destination of each packet, the network switch 500 determines a port to which the input packet is to be sent. In the example of FIG. 6, both of the two packets 21 and 22 are destined for the server 200. Thus, in the network switch 500, the communication port 520 to which the server 200 is coupled is selected as the port to which the packets 21 and 22 are to be sent. In this case, one input port gains a right to use the output port 522. The network switch 500 transfers the packet, stored in the buffer in the input port that gained the usage right, to the output port 522.

Figure 7:
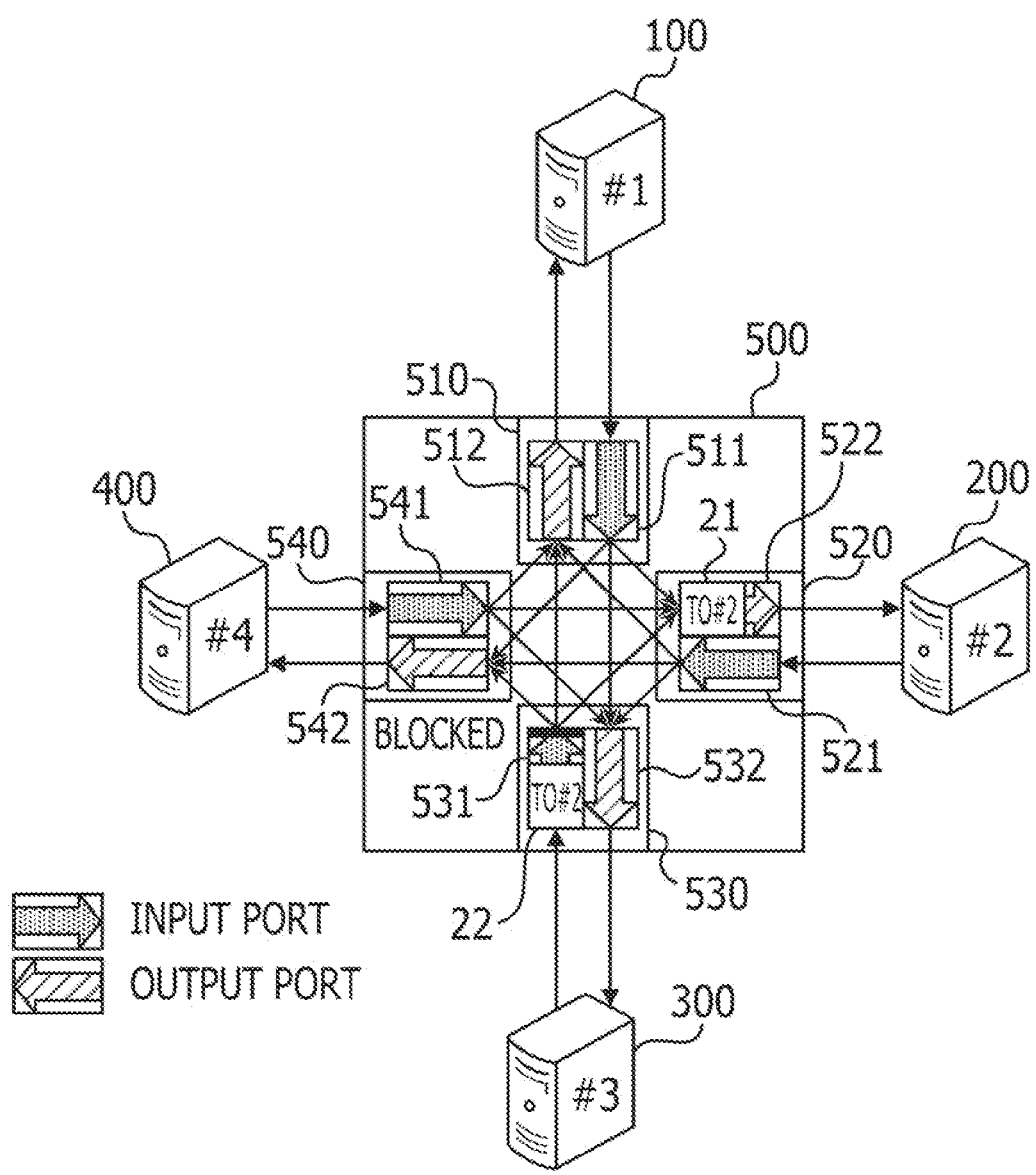
FIG. 7 illustrates a state in which HOL blocking occurs in the network switch.

FIG. 7 illustrates a state in which HOL blocking occurs in the network switch. In the example illustrated in FIG. 7, the input port 511 gained the usage right and the packet 21 has been transferred to the output port 522. The packet 22 may not be transferred from the input port 531 until the output port 522 becomes available. Thus, the packet 22 stored in the input port 531 is blocked by the network switch 500. When there are other packets that follow the packet 22 in the input port 531, these packets are also blocked in addition to the packet 22, even though destinations of these packets are not server 200 and these packets are not transferred to the output 520. Such a phenomenon of packet-transfer blocking due to a conflict for an output port is HOL blocking.

In order to suppress the occurrence of such HOL blocking, it is crucial to suppress the occurrence of conflicts for an output port. Accordingly, in the second embodiment, an algorithm for suppressing the occurrence of conflicts for the output port is employed to sequentially determine ports to/from which data are to be transmitted/received during execution of all-to-all inter-process communication of the servers 100, 200, 300, and 400. The algorithm for determining ports to/from which data are transmitted/received in the second embodiment is hereinafter referred to as a "2-level ring algorithm".

A function of each of the servers 100, 200, 300, and 400 for implementing the 2-level ring algorithm will be described below.

Figure 8:
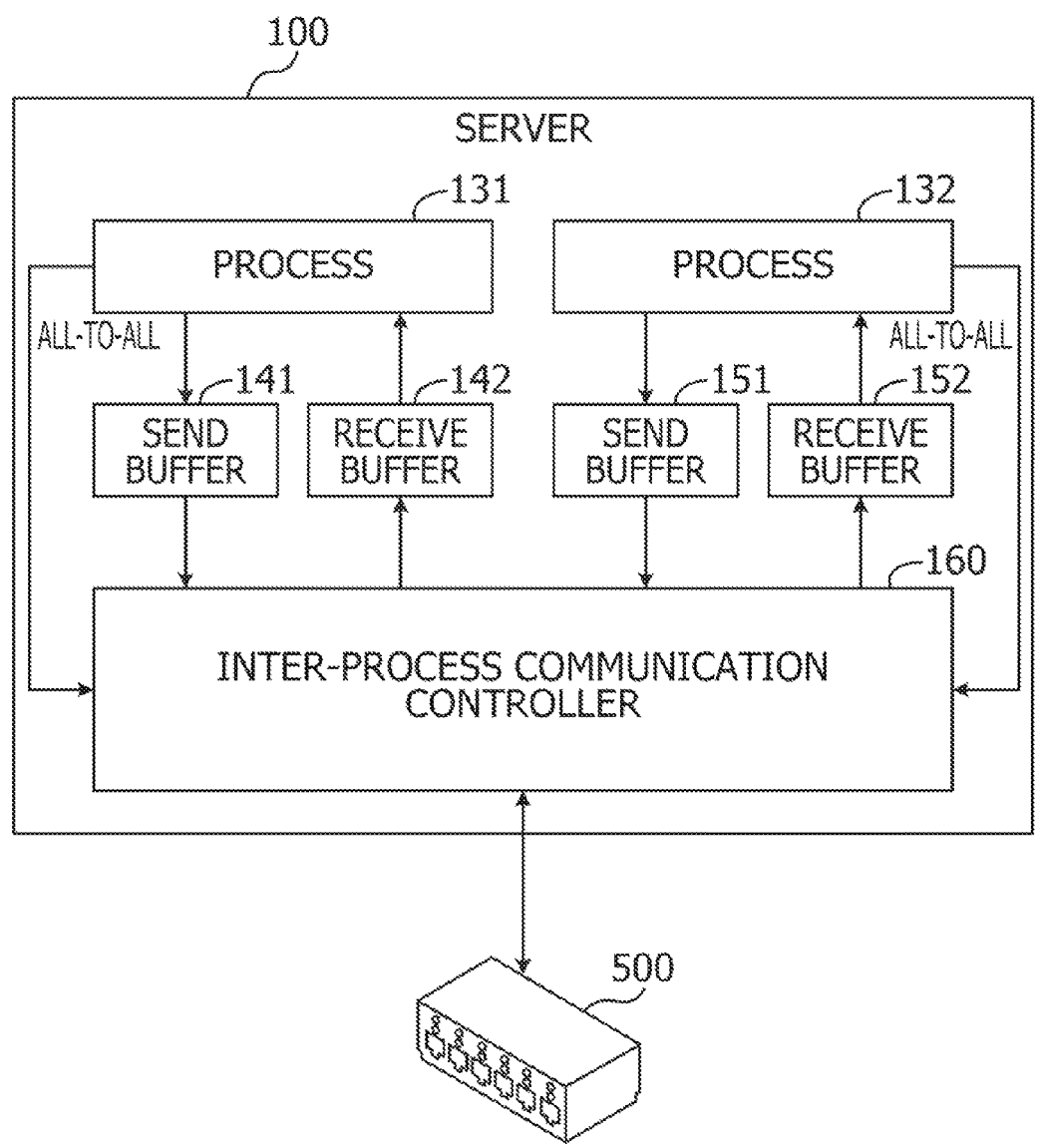
FIG. 8 is a block diagram of functions of a server.

FIG. 8 is a block diagram of functions of the server. The server 100 has a send buffer 141 and a receive buffer 142 for a process 131, a send buffer 151 and a receive buffer 152 for a process 132, and an inter-process communication controller 160.

The processor cores 111 and 112 execute the processes 131 and 132 for parallel computation in the cluster system. The processor cores 111 and 112 execute a program for executing calculation processing, so that the processes 131 and 132 are generated in the server 100.

The send buffer 141 and the receive buffer 142 are associated with the process 131. The send buffer 141 has a storage function for storing data that the process 131 hands over to a next computation operation. For example, a part of a storage area in the RAM 102 is used as the send buffer 141. The send buffer 141 contains data that the process 131 uses in the next computation operation and data that another process uses in the next computation operation.

The receive buffer 142 serves as a storage area for storing data that the process 131 uses to execute the next computation operation. For example, a part of the storage area in the RAM 102 is used as the receive buffer 142. The receive buffer 142 contains data generated by computation performed by the process 131 and data generated by computation performed by other processes.

Similarly to the process 131, the send buffer 151 and the receive buffer 152 are also associated with the process 132. The function of the send buffer 151 is the same as the send buffer 141. The function of the receive buffer 152 is the same as the receive buffer 142.

The inter-process communication controller 160 controls transfer of data exchanged between the processes. More specifically, the inter-process communication controller 160 transfers the data in the send buffers 141 and 151 to the processes in any of the servers 100, 200, 300, and 400. For transmitting data to the process executed by any of the servers 200, 300, and 400, the inter-process communication controller 160 generates a packet containing data to be sent and transmits the packet via the network switch 500.

The inter-process communication controller 160 stores, in the receive buffers 142 and 152, the data sent as a result of execution of the processes in any of the servers 100, 200, 300, and 400. The inter-process communication controller 160 obtains the data, sent as a result of execution of the processes in the other servers 200, 300, and 400, in the form of packets input via the network switch 500.

In the server 100 having a function as described above, for example, when the process 131 is to execute all-to-all communication, the processor core 111 that executes the process 131 issues an all-to-all communication request to the inter-process communication controller 160. The issuance of the all-to-all communication request corresponds to, for example, processing of summoning a function MPI_Alltoall( ) in the MPI. In response to the all-to-all communication request, the inter-process communication controller 160 executes data communication between the process 131 and other processes in accordance with the 2-level ring algorithm.

Figure 9:
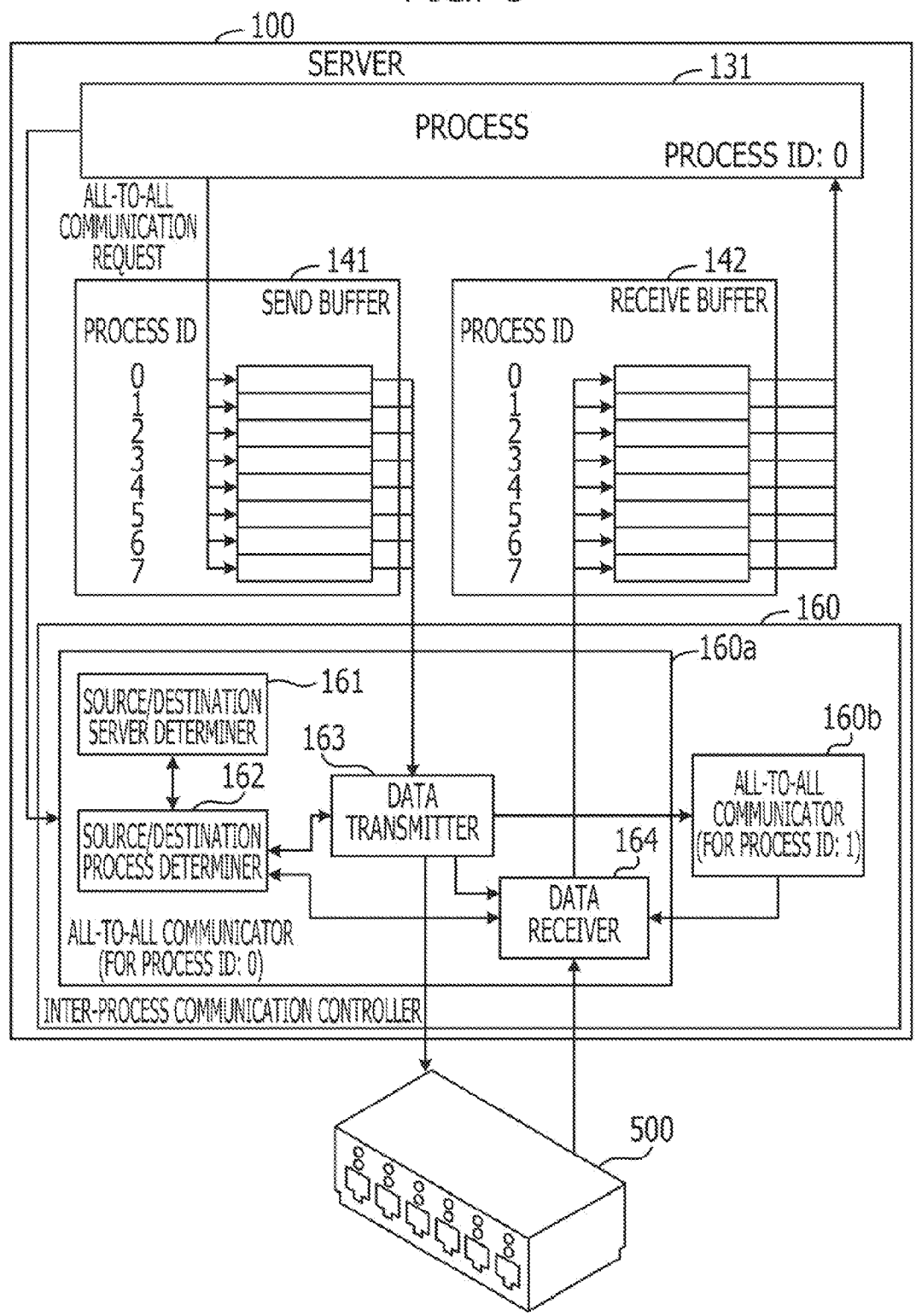
FIG. 9 is a block diagram of an all-to-all communication function of an inter-process communication controller.

FIG. 9 is a block diagram of the all-to-all communication function of the inter-process communication controller. In response to the all-to-all communication request, the inter-process communication controller 160 starts an all-to-all communicator 160a or 160b for the process that issued the all-to-all communication request. All-to-all communication performed in response to the all-to-all communication request issued as a result of execution of the process 131 will be described below in detail.

Before issuing the all-to-all communication request, the processor core 111 that executes the process 131 pre-stores transmission data in the send buffer 141. More specifically, the send buffer 141 has storage areas associated with the process IDs of processes for which calculation processing is being executed in the cluster system. The processor core 111 that executes the process 131 stores, in the storage areas associated with the process IDs of processes to which data are to be sent, the data to be handed over to the processes. The processor core 111 that executes the process 131 also stores, in the storage area corresponding to the local process ID, data that the process 131 uses in a next computation operation. After the storage of the data, destined for the processes, in the send buffer 141 is completed, the processor core 111 that executes the process 131 issues an all-to-all communication request to the inter-process communication controller 160; a buffer used for the calculation processing may also be directly used as the send buffer.

In response to the all-to-all communication request, the inter-process communication controller 160 starts the all-to-all communicator 160a. For example, the all-to-all communicator 160a is achieved by execution of an all-to-all communication program, the execution being performed by the processor core 111 executing the process 131.

The all-to-all communicator 160a executes data communication based on an all-to-all communication algorithm (i.e., the 2-level ring algorithm). For this purpose, the all-to-all communicator 160a has a source/destination server determiner 161, a source/destination process determiner 162, a data transmitter 163, and a data receiver 164.

When the all-to-all communication request is issued, the source/destination server determiner 161 sequentially determines a source server (a server from which data is to be received) and a destination server (a server to which data is to be transmitted) set. The source/destination server determiner 161 notifies the source/destination process determiner 162 of the determined set of the source server and the destination server. For example, the source/destination server determiner 161 sets the server IDs of the determined source server and destination server for variables representing a source server and a destination server. The source/destination process determiner 162 reads the information of the variables representing the source server and the destination server, so that the source/destination process determiner 162 is notified of the determined set of the source server and the destination server.

When a completion notification, indicating that transmission of data to the determined source server and reception of data from the determined destination server are completed, is received from the source/destination process determiner 162, the source/destination server determiner 161 determines the next source server and destination server set. The determination of a source server and a destination server set is repeated until transmission of all data in the send buffer 141 and reception of data sent from all processes to the receive buffer 142 are completed. Upon completion of the transmission of all data in the send buffer 141 and the reception of data regarding all processes sent to the receive buffer 142, the source/destination server determiner 161 issues, to the processor core 111 that executes the process 131, a notification indicating the completion of the all-to-all communication.

The order of determination of a source server and a destination server set is such that, when all-to-all communication of processes for which calculation processing is to be performed in the cluster system occurs, one server is determined as being unavailable as a destination server for processes on different servers. For example, the source/destination server determiner 161 sequentially determines a source server and a destination server in accordance with the 2-level ring algorithm.

According to a server determination part of the 2-level ring algorithm, when a determination is to be made for the first time, the source/destination server determiner 161 determines the server ID of the local server 100 as a source server and a destination server. When a determination is to be made for the second or subsequent time, the source/destination server determiner 161 determines, as a next source server, a server with a server ID having a value obtained by subtracting "1" from the server ID of the previously determined source server. However, when the server ID of the previously determined source server is "0", the source/destination server determiner 161 determines, as a next source server, a server whose server ID has a largest value. The source/destination server determiner 161 determines, as a next destination server, a server with a server ID having a value obtained by adding "1" to the server ID of the previously determined destination server. However, when the server ID of the previously determined destination server has a largest value of the server IDs, the source/destination server determiner 161 determines, as a next destination server, a server whose server ID is "0".

On the basis of the source server and the destination server set determined by the source/destination server determiner 161, the source/destination process determiner 162 determines a set of a source process (a process from which data is to be received) and a destination process (a process to which data is to be transmitted). The source process is determined from the processes in the source server. The destination process is determined from the processes in the destination server. The source/destination process determiner 162 notifies the data receiver 164 of the determined source process. The source/destination process determiner 162 notifies the data transmitter 163 of the determined destination process. For example, the source/destination process determiner 162 sets the process IDs of the determined source process and destination process for variables representing a source process and a destination process. By reading the information of the variable representing the source process, the data receiver 164 is notified of the determined source process. By reading the information of the variable representing the destination process, the data transmitter 163 is notified of the determined destination process.

When completion notifications are received from the data transmitter 163 and the data receiver 164 indicating that transmission of data to the destination process and reception of data from the determined source process are completed, the source/destination process determiner 162 determines the next set of a source process and a destination process. The determination of a source process and a destination process set is repeated until reception of data from each process included in the source server and determined by the source/destination process determiner 162 and transmission of data to each process included in the destination server and determined by the source/destination process determiner 162 are completed. When the reception of data from the determined process in the source server and the transmission of data to the determined process in the destination server are completed, the source/destination process determiner 162 notifies the source/destination server determiner 161 that the reception and transmission are completed.

The order of determination of source processes is such that, when all-to-all communication of multiple processes in the server 100 occurs, one process is not simultaneously selected as the source of multiple processes in the server 100. The order of determination of the destination processes is such that one process is not simultaneously selected as the destination of multiple processes in the server 100. For example, the source/destination process determiner 162 sequentially determines a source process and a destination process in accordance with the 2-level ring algorithm.

When a process determination based on the 2-level ring algorithm is performed for the first time, the source/destination process determiner 162 determines, as a source and destination process, a process having the same per-server process ID as the process 131 that issued the all-to-all communication request. When a determination is to be made for the second or subsequent time, the source/destination process determiner 162 determines, as a next source process, a process with a process ID having a value obtained by subtracting "1" from the process ID of the previously determined source server. However, when the process ID of the previously determined source process is "0", the source/destination process determiner 162 determines, as a next source process, a process whose process ID has a largest value. The source/destination process determiner 162 determines, as a next destination process, a process with a process ID having a value obtained by adding "1" to the process ID of the previously determined destination process. However, when the process ID of the previously determined destination process has a largest value of the process IDs, the source/destination process determiner 162 determines, as a next destination process, a process whose process ID is "0".

The data transmitter 163 transmits data to the processor core that executes the destination process determined by the source/destination process determiner 162. More specifically, the data transmitter 163 reads data from the send buffer 141 corresponding to the process ID of the determined destination process. Next, on the basis of the process ID of the destination process, the data transmitter 163 determines a server on which the destination process is running. In the second embodiment, a quotient obtained by dividing the process ID by the number of per-server processes is used as the server ID of the server on which the process indicated by the process ID is running.

When the destination process is running on another server, the data transmitter 163 generates a message destined for the server that executes the destination process. In accordance with a network transmission protocol, the data transmitter 163 generates a packet for transmitting the generated message. The generated packet contains data to be transmitted to the destination process. The data transmitter 163 outputs the generated packet to the network switch 500. The network switch 500 then transfers the packet to the destination server.

When the destination process is the process 131 that is to transmit the data, the data transmitter 163 passes the data to the data receiver 164. When the destination process is another process 132 in the server 100, the data transmitter 163 passes the data to the all-to-all communicator 160b for the process 132.

Upon completion of the transmission of the data for the destination process, the data transmitter 163 issues a transmission-completion notification to the source/destination process determiner 162.

The data receiver 164 receives the data output from the source process determined by the source/destination process determiner 162. Specifically, on the basis of the process ID of the source process, the data receiver 164 determines a server on which the source process is running. The data receiver 164 then waits until data transmitted from the source process is input from the server on which the source process is running. Upon input of the data, the data receiver 164 stores the input data in the storage area included in the receive buffer 142 and associated with the process ID of the source process.

When the source process is running on another server, the data receiver 164 receives, from the server that executes the source process, a packet containing data output from the source process. During the packet reception, the data receiver 164 reserves, in a message buffer area for temporarily storing a message received through a network, an area for storing the message containing the data output from the source process. When the packet containing the data transmitted from the source process is input from the destination server, the data receiver 164 analyzes the packet to generate the message and stores the message in the reserved message buffer area. The data receiver 164 extracts the data from the message stored in the message buffer area and stores the extracted data in the storage area included in the receive buffer 142 and associated with the process ID of the source process.

When the source process is the process 131 that is to receive the data, the data receiver 164 obtains the data from the data transmitter 163. When the source process is another process 132 in the server 100, the data receiver 164 obtains the data from the all-to-all communicator 160b for the process 132.

The all-to-all communicator 160b for the process 132 also has a function that is similar to that of the all-to-all communicator 160a.

In the server 100 according to the second embodiment illustrated in FIG. 9, the functions of the all-to-all communication modules 4-1, 4-2, 4-3, . . . , out of the functions in the first embodiment illustrated in FIG. 1, are implemented by the inter-process communication controller 160. More specifically, the functions of the destination-server determination module 4a and the source-server determination module 4d are implemented by the source/destination server determiner 161. The functions of the destination-process determination module 4b and the source-process determination module 4e are implemented by the source/destination process determiner 162. The function of the data transmission module 4c is implemented by the data transmitter 163. The function of the data reception module 4f is implemented by the data receiver 164.

A procedure of the all-to-all communication processing executed by the inter-process communication controller 160 will be described next.

FIG. 10 is a flowchart of the procedure of the all-to-all communication processing. The processing illustrated in FIG. 10 will now be described along with step numbers.

In step S11, the inter-process communication controller 160 determines whether or not an all-to-all communication request is issued from the processor cores 111 and 112 that execute the processes 131 and 132. When the all-to-all communication request is issued, the process proceeds to step S12. When the all-to-all communication request is not issued, the inter-process communication controller 160 repeats the processing in step S11 and waits for issuance of the all-to-all communication request.

In step S12, the inter-process communication controller 160 starts the all-to-all communicator for performing all-to-all communication for the process that issued the all-to-all communication request. In this case, it is assumed that the all-to-all communication request was issued from the process 131. In this case, the all-to-all communicator 160a is started. The source/destination server determiner 161 in the started all-to-all communicator 160a sequentially determines a source server and a destination server set in accordance with the 2-level ring algorithm. Each time a source server and a destination server set is determined, the source/destination server determiner 161 issues a notification indicating the determination result to the source/destination process determiner 162.

In step S13, the source/destination process determiner 162 receives the set of the source server and the destination server determined by the source/destination server determiner 161 and then sequentially determines a source process and a destination process set in accordance with the 2-level ring algorithm. The source process determined in this case is a process in the source server. The source/destination process determiner 162 notifies the data transmitter 163 of the process ID of the determined destination process. The source/destination process determiner 162 notifies the data receiver 164 of the process ID of the determined source process.

In step S14, the data transmitter 163 and the data receiver 164 execute inter-process communication. More specifically, the data transmitter 163 reads, from the send buffer 141, data corresponding to the process ID of the determined destination process and transmits the obtained data to the determined destination process. Upon completion of the transmission of the data, the data transmitter 163 issues a transmission-completion notification to the source/destination process determiner 162. The data receiver 164 receives data of the determined source process and stores the received data in the storage area included in the receive buffer 142 and associated with the process ID of the determined source process. Upon completion of the reception of the data, the data receiver 164 issues a reception-completion notification to the source/destination process determiner 162.

In step S15, the source/destination process determiner 162 determines whether or not the communications of the data transmitter 163 and the data receiver 164 are completed. More specifically, when the source/destination process determiner 162 receives the transmission-completion notification from the data transmitter 163 and receives the reception-completion notification from the data receiver 164, the source/destination process determiner 162 determines that the communications are completed. When the communications are completed, the process proceeds to step S16. When the communications are not completed, the processing in step S15 is repeated.

When the communications with the determined source process and destination process are completed, the process proceeds to step S16 in which the source/destination process determiner 162 determines whether or not communications with all of processes in the determined source server and destination server are completed. More specifically, when the reception of data from each process in the source server and the transmission of data to each process in the destination server are completed, the source/destination process determiner 162 determines that communications with all processes in the source/destination servers are completed. When communications with all processes in the source/destination servers are completed, the process proceeds to step S17. When there is any process with which communication has not been executed in the processes in the source/destination servers, the process returns to step S13 in which the uncommunicated process is determined as a source/destination process.

When communications with all processes in the source/destination servers are completed, the process proceeds to step S17 in which the source/destination server determiner 161 determines whether or not communications with all servers included in the cluster system are completed. When the communications for data transmission and reception with all servers are completed, the all-to-all communication processing ends. When there is any server with which communication has not executed, the process returns to step S12 in which the source/destination server determiner 161 determines the uncommunicated server as a source/determination server.

In accordance with such a procedure, all-to-all communication based on the 2-level ring algorithm is executed. The all-to-all communication may also be summoned by, for example, the function MPI_Alltoall( ). In such case, a function for summoning a processing description for determining a source/destination process in accordance with the 2-level ring algorithm is predefined. In this case, summoning the function is performed as an issuance of an all-to-all communication request. Upon summoning the function, processing based on the processing description corresponding to the function is executed.

FIG. 11 illustrates an example of the processing description for making a process determination based on the 2-level ring algorithm according to the second embodiment. As illustrated in FIG. 11, the processing for the 2-level ring algorithm may be written using, for example, a "for" statement. Variables in FIG. 11 represent the following information; the left side of ":" indicates a variable name and the right side of ":" indicates the meaning of the variable:

Ns: the number of servers
Nl: the number of per-server processes (the number of processes per server)
Np: the total number of processes (Np=Ns×Nl)
Is: local server ID (0≤Is<Ns)
Il: local per-server process ID (0≤Il<Nl)
Ip: local process ID (Ip=Is×Nl+Il)
Is_src: source server ID
Is_dst: destination server ID
Ip_src: source process ID
Ip_dst: destination process ID The first to third lines in the processing description state a procedure for determining a source server and a destination server.

The first line defines repletion processing with the "for" statement. Variable "s" is set to "0" as a default value. Each time the processing in the "for" statement is repeated once, the variable "s" is incremented (s++). When the value of the variable "s" is less than the number "Ns" of servers, the processing from the second line to the seventh line is repeated.

The second line defines an expression for determining a source server. The value of the variable "s" is subtracted from the local server ID "Is" and the number "Ns" of servers is added to the value of the subtraction. The remainder obtained by dividing the result of the subtraction and addition by the number "Ns" of servers is set for the source server ID "Is_src".

The third line defines an expression for determining a destination server. The value of the variable "s" and the number "Ns" of servers are added to the local server ID "Is". The remainder obtained by dividing the result of the addition by the number "Ns" of servers is set for the destination server ID "Is_dst".

The fourth to sixth lines in the processing description state a procedure for determining a source process and a destination process. The processing in the fourth to sixth lines is part of the processing in the "for" statement in the first line.

The fourth line defines repletion processing with a "for" statement. Variable "l" is set to "0" as a default value. Each time the processing in the "for" statement is repeated once, the variable "l" is incremented (l++). When the value of the variable "l" is less than the number "Nl" of per-server processes, the processing from the fifth to seventh lines is repeated.

The fifth line defines an expression for determining a source process. In the expression defined in the fifth line, the source server ID "Is_src" is multiplexed by the number "Nl" of per-server processes. The value of the variable "l" is subtracted from the local per-server process ID "Il", the number "Nl" of per-server processes is added to the result of the subtraction, and the result of the subtraction and addition is divided by the number "Nl" of per-server processes. The value obtained by adding the remainder after the division to the result of the above-described multiplication is set for the source process ID "Ip_src".

The sixth line defines an expression for determining a destination process. In the expression defined in the sixth line, the destination server ID "Is_dst" is multiplexed by the number "Nl" of per-server processes. The value of the variable "l" and the number "Nl" of per-server processes are added to the local per-server process ID "Il" and the result of the addition is divided by the number "Nl" of per-server processes. The value obtained by adding the remainder after the division to the result of the above-described multiplication is set for the destination process ID "Is_dst".

The seventh line defines summoning of a function for executing communication processing. In summoning the communication-processing function, the source process ID "Ip_src" is specified as the source from which data is to be received and the destination process ID "Is_dst" is specified as the destination to which data is to be transmitted.

As a result of execution of the processing in accordance with a processing procedure as described above, all-to-all communication in which the processes are executed based on the 2-level ring algorithm is performed. The all-to-all communication processing based on the 2-level ring algorithm suppresses the occurrence of HOL blocking. A description below will be given of an advantage of the 2-level ring algorithm over a ring algorithm.

Changes in the state of the inter-process communication when the all-to-all communication based on a ring algorithm is performed will first be described with reference to FIGS. 12 and 13.

FIG. 12 is a first drawing illustrating changes in the state of the inter-process communication based on the ring algorithm. In FIG. 12, the servers 100, 200, 300, and 400 are represented by rectangles and processes executed in each of the servers 100, 200, 300, and 400 are represented by circles. A process ID is indicated in the circle representing each process.

In the ring algorithm, the process IDs of processes to which data are to be transmitted are arranged in a ring. For example, the process IDs are arranged in ascending order and it is defined that a process ID "7", which is a largest value, is followed by a process ID "0", which is a smallest value. In the example illustrated in FIG. 12, the processes are arranged clockwise in order of the process ID. In the following description, a source process and a destination process are expressed in FIG. 12 by positions relative to a process that issues an all-to-all communication request.

Figure 13:
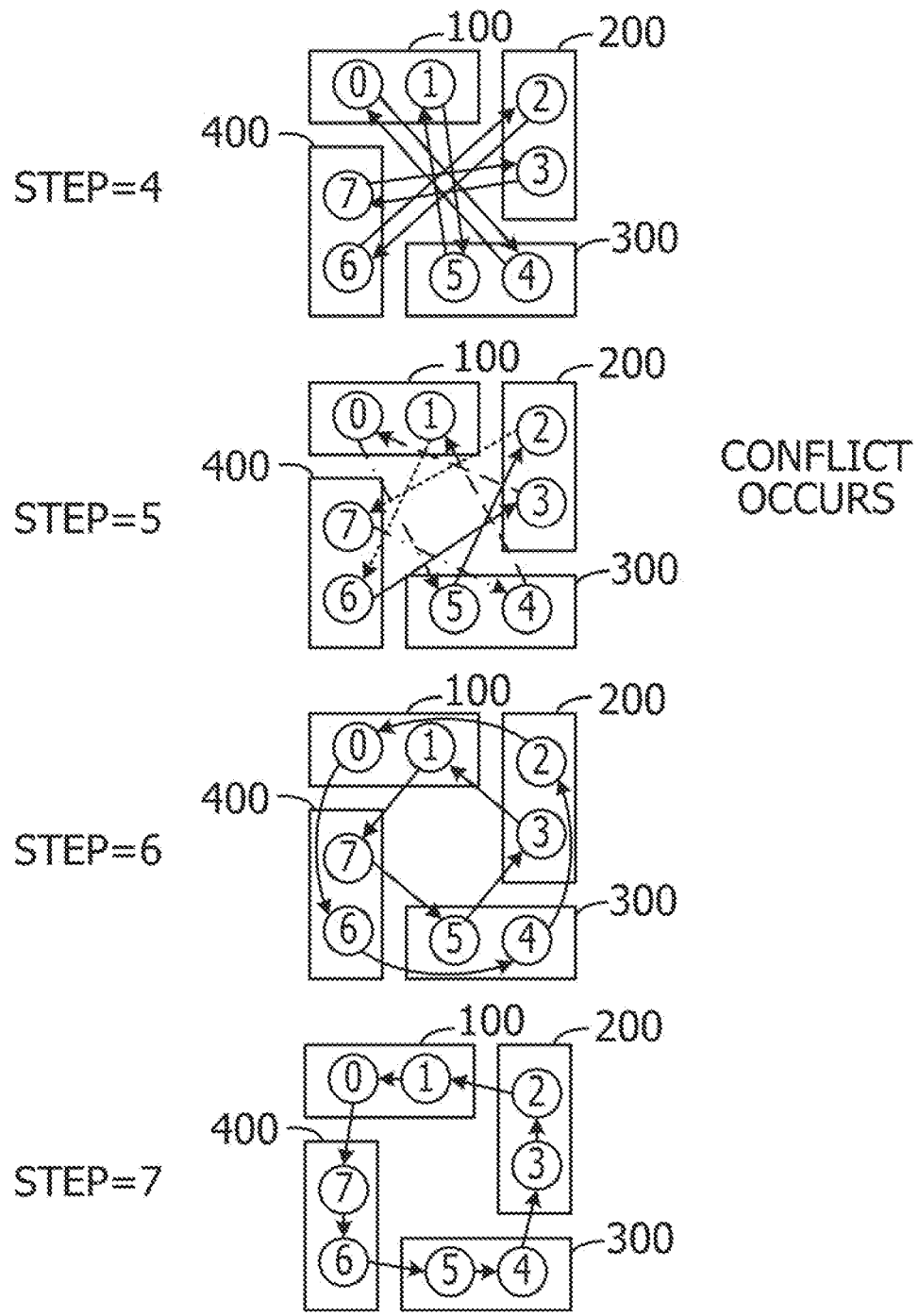
FIG. 13 is a second drawing illustrating changes in the state of the inter-process communication based on the ring algorithm.

It is assumed that the process IDs corresponding to eight processes are arranged in a ring, as illustrated in FIGS. 12 and 13. In this case, when all-to-all communication based on the ring algorithm is performed, eight operations are required to complete all communications. FIG. 12 illustrates communication states in operations with step numbers 0 to 3.

In the operation (step=0), the process that issued an all-to-all communication request becomes a source process and a destination process.

In the operation (step=1), a process corresponding to a process ID at a position shifted counterclockwise by one process from the process ID of the process that issued the all-to-all communication request becomes the source process. A process corresponding to a process ID at a position shifted clockwise by one process from the process ID of the process that issued the all-to-all communication request becomes the destination process.

In the operation (step=2), a process at a position shifted counterclockwise by two processes from the process that issued the all-to-all communication request becomes the source process. A process at a position shifted clockwise by two processes from the process that issued the all-to-all communication request becomes the destination process.

In the operation (step=3), a process at a position shifted counterclockwise by three processes from the process that issued the all-to-all communication request becomes the source process. A process at a position shifted clockwise by three processes from the process that issued the all-to-all communication request becomes the destination process.

FIG. 13 is a second drawing illustrating changes in the state of the inter-process communication based on the ring algorithm. FIG. 13 illustrates communication states in operations with step numbers 4 to 7.

In the operation (step=4), a process at a position shifted counterclockwise by four processes from the process that issued the all-to-all communication request becomes the source process. A process at a position shifted clockwise by four processes from the process that issued the all-to-all communication request becomes the destination process.

In the operation (step=5), a process at a position shifted counterclockwise by five processes from the process that issued the all-to-all communication request becomes the source process. A process at a position shifted clockwise by five processes from the process that issued the all-to-all communication request becomes the destination process.

In the operation (step=6), a process at a position shifted counterclockwise by six processes from the process that issued the all-to-all communication request becomes the source process. A process at a position shifted clockwise by six processes from the process that issued the all-to-all communication request becomes the destination process.

In the operation (step=7), a process at a position shifted counterclockwise by seven processes from the process that issued the all-to-all communication request becomes the source process. A process at a position shifted clockwise by seven processes from the process that issued the all-to-all communication request becomes the destination process.

In the example illustrated in FIGS. 12 and 13, the number of per-server processes is two. When all-to-all communication based on the ring algorithm is performed as described above under a situation in which multiple processes are running on one server, a conflict for using an output port occurs during each of the communications in the fourth operation (step=3) and in the sixth operation (step=5). In the fourth operation (step=3) in FIG. 12 and the sixth operation (step=5) in FIG. 13, communications that conflict with each other are denoted by the same line types (a solid line, a broken line, a dotted line, and a dashed-dotted line).

Figure 14:
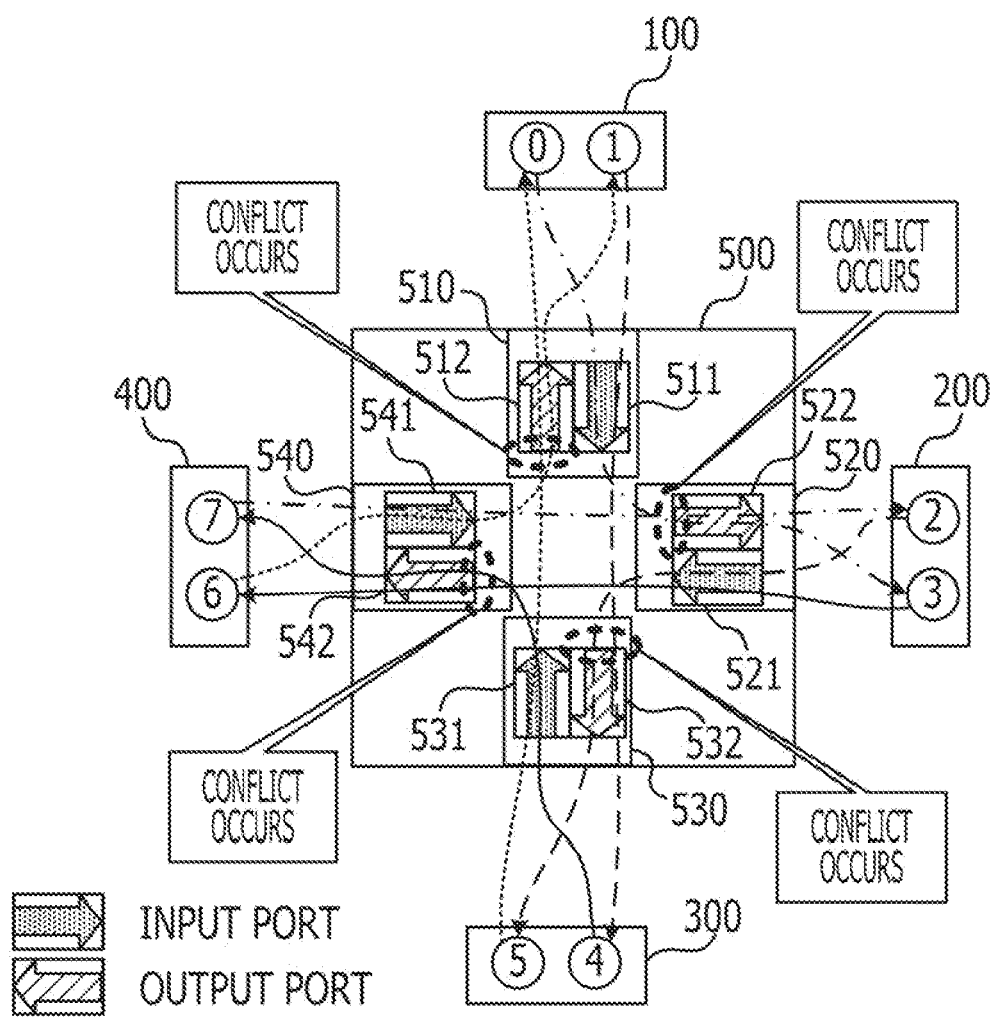
FIG. 14 illustrates a state in which a conflict occurs in a fourth operation (step=3)

FIG. 14 illustrates a state in which a conflict occurs in the fourth operation (step=3). In FIG. 14, data transfer paths for processes that transmit and receive data to be exchanged between the processes are indicated by lines. Transfer paths for conflicting communications are represented by the same line types (a solid line, a broken line, a dotted line, and a dashed-dotted line).

When packets are simultaneously transferred from different input ports to each of the output ports 512, 522, 532, and 542 in the network switch 500, a conflict occurs at the output port. For example, data from the processor core that executes the process with process ID "1" in the server 100 is transferred to the process with process ID "4" in the server 300. For example, data from the processor core that executes the process with process ID "2" in the server 200 is also transferred to the process with process ID "5" in the server 300. The two pieces of transferred data go through the output port 532 of the communication port 530 coupled to the server 300. In this case, the processes from which the data are received exist on the different servers. Thus, conflicts for gaining the right to use the output port 532 may occur.

In the example illustrated in FIG. 14, there is a possibility that conflicts occur at all output ports 512, 522, 532, and 542. When a conflict occurs, only one of the input ports attempting to transfer packets to the same output port gains the right to use the output port earlier. The input port that failed to gain the usage right generates HOL blocking.

Although the total number of processes is eight for ease of understanding in the examples illustrated in FIGS. 12 to 14, a larger number of processes are in many cases running in an actual cluster system. The execution times of the communication operations based on the ring algorithm were measured in a cluster system having a total of 128 processes.

Figure 15:
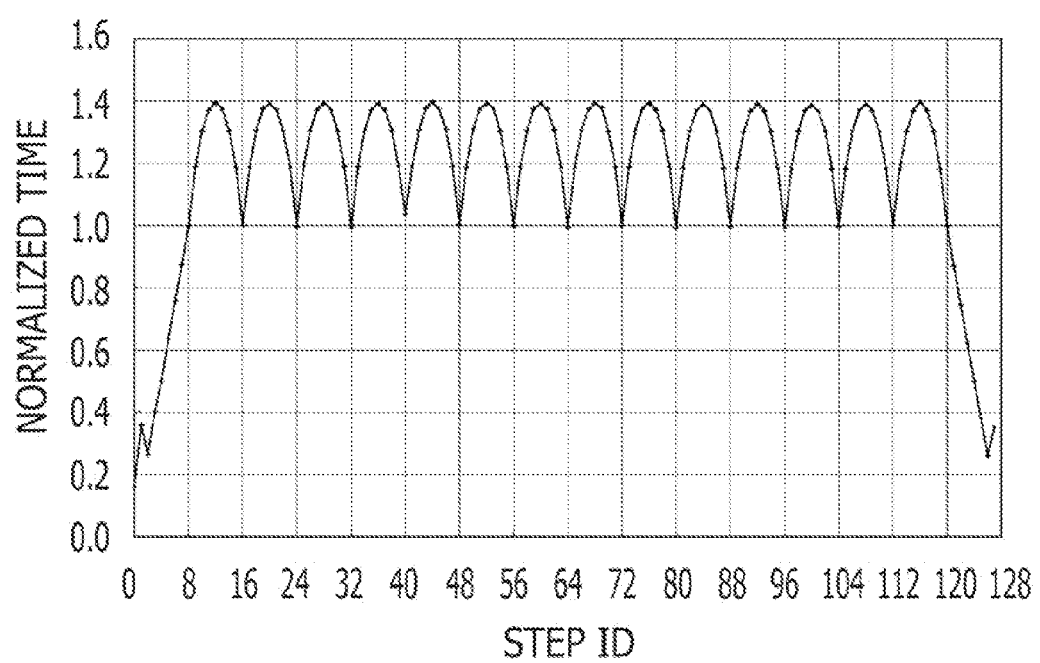
FIG. 15 is a graph illustrating the execution times of communication operations based on the ring algorithm.

FIG. 15 is a graph illustrating the execution times of the communication operations based on the ring algorithm. FIG. 15 illustrates results obtained by measuring the execution times of communications in the communication operations based on the ring algorithm for the cluster system having a total of 128 processes (16 servers×8 per-server processes). In this case, the servers were implemented by 8-core IA servers. Equipment that complies with DDR (double data rate) InfiniBand was used for the communication. The data size of transmission/reception between the processes was 1 MB.

The horizontal axis in FIG. 15 indicates the step numbers of the communication. The vertical axis indicates communication time normalized with the execution time of communication when the communication step number is a multiple of 8 (except for the step number "0"). That is, when the execution time of communication is expressed by a time unit (1.0) where the communication step number is a multiple of 8, the vertical axis indicates how many time units are required for the execution time of communication in each operation.

The reason why the execution time of communication when the communication step number is a multiple of 8 is used as a reference is that, when the communication step number is a multiple of 8 which is the number of per-server processes, it is presumed that conflicts for using an output port and HOL blocking do not occur. Thus, when the communication step number is a multiple of 8 which is the number of per-server processes, data in the individual processes in each source server are transmitted to the same destination server. With this arrangement, since each destination server to which packets are transmitted from the source servers are different, conflicts for using an output port and HOL blocking do not occur. For example, in the example illustrated in FIGS. 12 and 13, the number of per-server processes is 2. In each of the operations with steps number 2, 4, and 6 which are multiples of 2, conflicts for using an output port and HOL blocking do not occur.

As may be understood from FIG. 15, when the communication step number is not a multiple of the number of per-server processes, the execution time takes longer. This is because a conflict for using an output port occurs in the network switch 500 which causes HOL blocking. That is, it may be understood that the communication efficiency declines because of the occurrence of HOL blocking.

In the example illustrated in FIG. 15, the communication execution time for a step number of 7 or less and a step number of 121 or more is less than the communication execution time when the step number is a multiple of 8. This is because, for communication in the operations with step numbers 7 or less and 121 or more, there is communication between the processes in the same server, and the amount of inter-process communication performed via the network switch is smaller than that in other operations.

For the reason describe above, the all-to-all communication based on the ring algorithm is not appropriate for a cluster system including servers having multi-core processors.

Changes in the state of inter-process communication based on the 2-level ring algorithm will now be described with reference to FIGS. 16 and 17.

Figure 16:
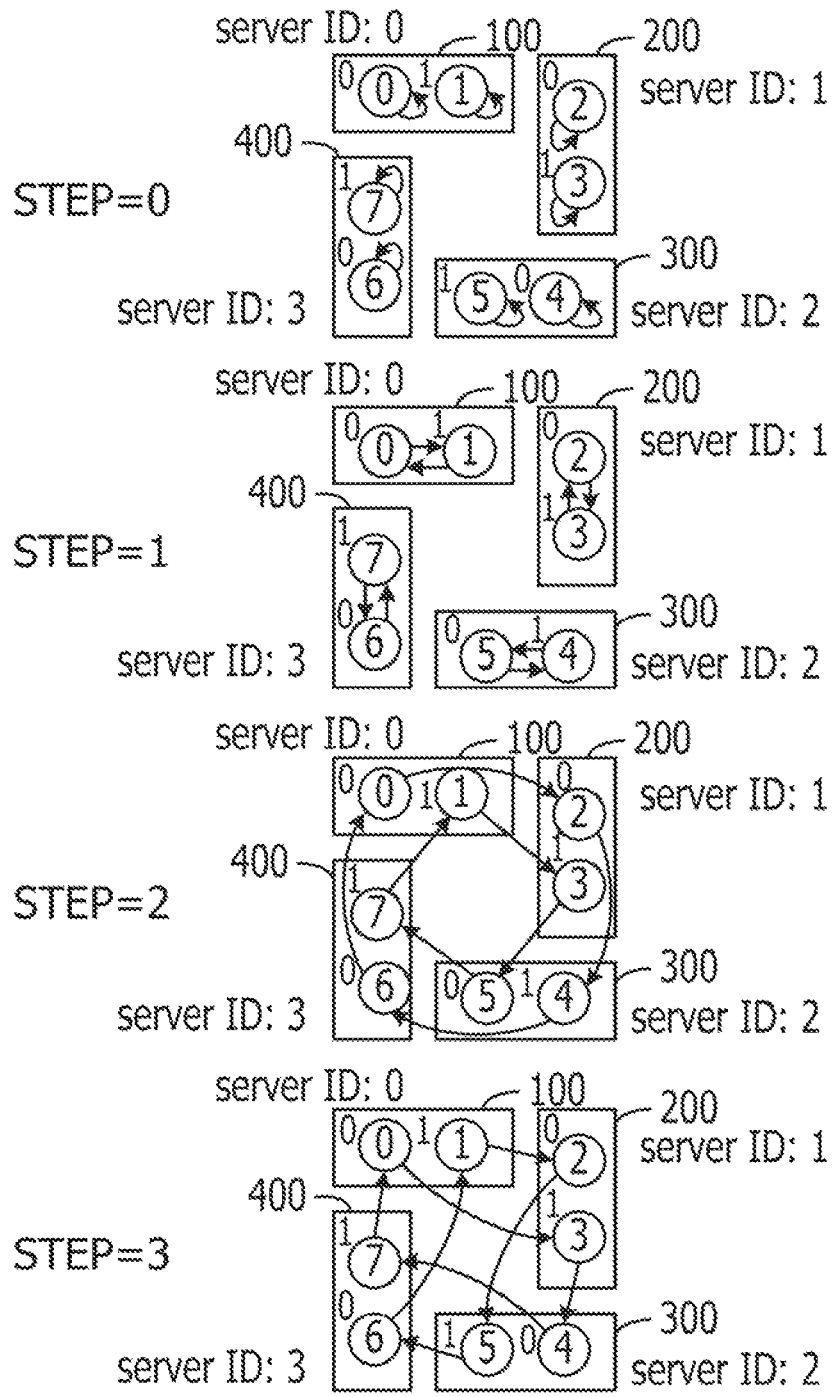
FIG. 16 is a first drawing illustrating changes in the state of inter-process communication based on the 2-level ring algorithm.

FIG. 16 is a first drawing illustrating changes in the state of inter-process communication based on the 2-level ring algorithm. In FIG. 16, the servers 100, 200, 300, and 400 are represented by rectangles and processes executed in each of the servers 100, 200, 300, and 400 are represented by circles. The process ID of each process is indicated in the circle representing the process. The per-server process ID of each process is indicated at the upper left of the circle representing the process.

According to the 2-level ring algorithm, the server IDs of the servers are arranged in a ring. For example, the server IDs are arranged in ascending order and it is defined that a server ID "3", which is a largest value, is followed by a server ID "0", which is a smallest value. In the example illustrated in FIG. 16, the servers are arranged clockwise in order of the server ID. In the following description, a source server and a destination server are expressed in FIG. 16 by positions relative to a server that is executing a process that issues an all-to-all communication request.

In the 2-level ring algorithm, the per-server process IDs of processes to which data are to be transmitted are also arranged in a ring for each server. For example, the per-server process IDs are arranged in ascending order and it is defined that a per-server process ID "1", which is a largest value, is followed by a per-server process ID "0", which is a smallest value.

Figure 17:
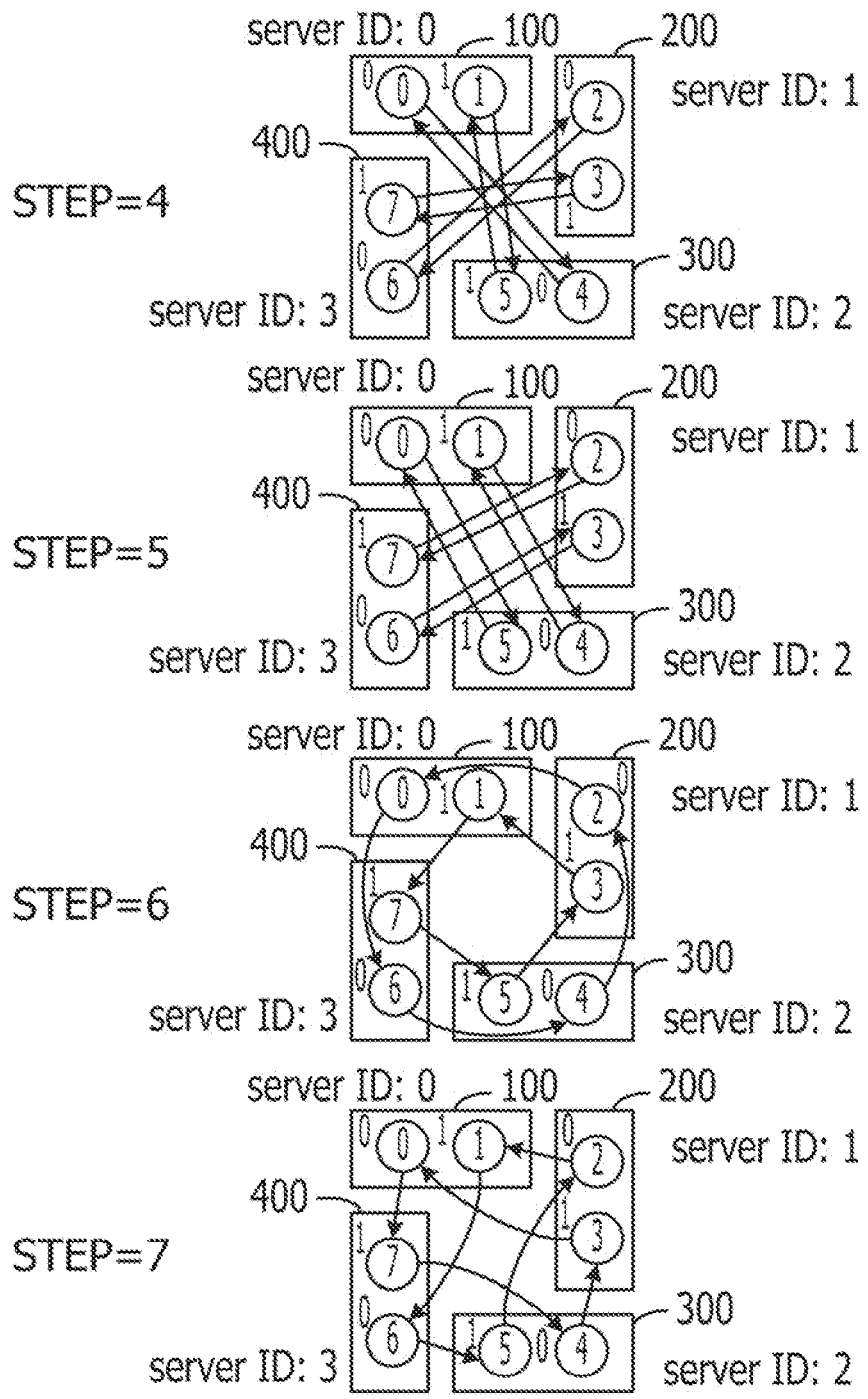
FIG. 17 is a second drawing illustrating changes in the state of the inter-process communication based on the 2-level ring algorithm.

It is assumed that four servers and eight processes are arranged in rings, as illustrated in FIGS. 16 and 17. In this case, when all-to-all communication based on the 2-level ring algorithm is performed, eight operations are required to complete all communications. FIG. 16 illustrates communication states in operations with step numbers 0 to 3.

In the operation numbered "0" (step=0), the process that issued the all-to-all communication request becomes a source process and a destination process.

In the operation numbered 1 (step=1), another process in the server on which the process that issued the all-to-all communication request is running becomes the source process and the destination process.

In the operation numbered 2 (step=2), the server at a position shifted counter-clockwise by one server from the server on which the process that issued the all-to-all communication request is running becomes the source server. The server located at a position shifted clockwise by one server from the server on which the process that issued the all-to-all communication request is running becomes the destination server. In addition, the process running on the source server and having the same per-server process ID as the process that issued the all-to-all communication request becomes the source process. The process running on the destination server and having the same per-server process ID as the process that issued the all-to-all communication request becomes the destination process.

In the operation numbered 3 (step=3), the reception source server and the destination server are the same as those in the operation numbered 2. However, a process next to the process running on the source server and having the same per-server process ID as the process that issued the all-to-all communication request becomes the source process. A process next to the process running on the destination server and having the same per-server process ID as the process that issued the all-to-all communication request becomes the destination process.

FIG. 17 is a second drawing illustrating changes in the state of the inter-process communication based on the 2-level ring algorithm. FIG. 17 illustrates communication states in operations with step numbers 4 to 7.

In the operation numbered 4 (step=4), the server at a position shifted counterclockwise by two servers from the server on which the process that issued the all-to-all communication request is running becomes the source server. The server at a position shifted clockwise by two servers from the server on which the process that issued the all-to-all communication request is running becomes the destination server. In addition, the process running on the source server and having the same per-server process ID as the per-server process ID of the process that issued the all-to-all communication request becomes the source process. The process running on the destination server and having the same per-server process ID as the per-server process ID of the process that issued the all-to-all communication request becomes the destination process.

In the operation numbered 5 (step=5), the source server and the destination server are the same as those in the operation numbered 4. However, a process next to the process running on the source server and having the same per-server process ID as the process that issued the all-to-all communication request becomes the source process. A process next to the process running on the destination server and having the same per-server process ID as the process that issued the all-to-all communication request becomes the destination process.

In the operation numbered 6 (step=6), the server at a position shifted anticlockwise by three servers from the server on which the process that issued the all-to-all communication request is running becomes the source server. The server at a position shifted clockwise by three servers from the server on which the process that issued the all-to-all communication request is running becomes the destination server. In addition, the process running on the source server and having the same per-server process ID as the per-server process ID of the process that issued the all-to-all communication request becomes the source process. The process running on the destination server and having the same per-server process ID as the per-server process ID of the process that issued the all-to-all communication request becomes the destination process.

In the operation numbered 7 (step=7), the source server and the destination server are the same as those in the operation numbered 6. However, a process next to the process running on the source server and having the same per-server process ID as the process that issued the all-to-all communication request becomes the source process. A process next to the process running on the destination server and having the same per-server process ID as the process that issued the all-to-all communication request becomes the destination process.

Such all-to-all communication based on the 2-level ring algorithm inhibits multiple processes executed by different servers from simultaneously transferring data to one server, and also suppresses the occurrence of conflicts for using an output port. This results in a decrease in the occurrence of HOL blocking and a reduction in the execution time of communication.

FIG. 18 illustrates results of measurement of effective network bandwidths for the 2-level ring algorithm and the ring algorithm. In the case of FIG. 18, the servers are implemented by 8-core IA servers. Equipment that complies with DDR (double data rate) InfiniBand was used for the communication. The number of servers used was 16. The data size of transmission/reception between the processes was 1 MB. With this hardware configuration, effective network bandwidths during all-to-all communication were measured when the number of per-server processes was 1, 2, 4, and 8. The unit of the effective network bandwidth is gigabytes per second (GB/s). When the number of per-server processes is 1, 2, or 4, only some of the processor cores in each server execute processes for computation processing.

When the number of per-server processes is 1, no significant difference in the effective network bandwidth between the 2-level ring algorithm and the ring algorithm can be seen. When there are a multiple number of per-server processes, the effective network bandwidth for the 2-level ring algorithm is apparently larger than the effective network bandwidth for the ring algorithm. As the number of per-server processes increases, the difference between the effective network bandwidth for the 2-level ring algorithm and the effective network bandwidth for the ring algorithm increases.

FIG. 18 illustrates performance improvement rates when the communication algorithm for the all-to-all communication is changed from the ring algorithm to the 2-level ring algorithm. The performance improvement rate expresses, in a percentage ratio, an amount of increase in the effective network bandwidth for the 2-level ring algorithm relative to the effective network bandwidth for the ring algorithm. As illustrated in FIG. 18, as the number of per-server processes increases, the performance improvement rate increases.

A possible reason why the effective network bandwidth for the ring algorithm decreases when there are a large number of per-server processes is that HOL blocking occurs in the network switch. As illustrated in FIG. 15, when the step number is a multiple of the number of per-server processes, no HOL blocking occurs, but for other step numbers, HOL blocking may occur. When the number of servers was 16, the number of per-server processes was 8, and the total number of processes was 128, the execution time in each operation according to the ring algorithm was actually measured. The result of the measurement reveals that the amount of execution time actually increases when the step number is not a multiple of the number of per-server processes. The ring algorithm, therefore, is not appropriate for a cluster system in which one server executes multiple processes.

In contrast, the 2-level ring algorithm makes it possible to suppress the occurrence of HOL blocking in all-to-all communication. As a result, as illustrated in FIG. 18, even for an increased number of per-server processes, it is possible to minimize a reduction in the network bandwidth.

As described above, since the known ring algorithm does not consider to which server each process belongs, there is a possibility that a conflict occurs in the network switch in a certain communication operation. In contrast, the 2-level ring algorithm considers to which server each process belongs, and in any communication operation, processes in one server receive data from processes in the same source server. As a result, a conflict for using an output port does not occur in the network switch 500, thus making it possible to achieve intended communication performance. For a cluster system in which the total number of processes is 128 (16 servers×8 per-server processes), it is confirmed that the 2-level ring algorithm improves the effective network bandwidth by 22.5% compared to the ring algorithm (as illustrated in FIG. 18).

Furthermore, the 2-level ring algorithm is adapted so that, during determination of destination processes, a single process of the multiple processes is not redundantly set as a destination process. If processes in one server do not evenly receive data, the processing efficiency of the server declines. In other words, if there is a process that does not evenly receive data, a process with missing data is generated, and the processing capability of the processor core that executes the process is not fully utilized. The occurrence of a processor core that is not using its entire processing capability means a decline in the overall processing efficiency of the server. According to the 2-level ring algorithm, since the amounts of processing among the processor cores in the servers during all-to-all communication are equalized, a decline in the processing efficiency of the servers is prevented.

In addition, according to the second embodiment, the source process is pre-determined so that data transmitted from the determined source process may be preferentially received. That is, since the buffer for storing a message containing the data transmitted from the source process is provided, it is possible to prevent the occurrence of message-transfer waiting due to a buffer shortage at the receiving side. Consequently, it is possible to preferentially and efficiently execute the all-to-all inter-process communication.

Third Embodiment

A third embodiment will be described next. The third embodiment is directed to an example of the 2-level ring algorithm when the assignments of the process IDs to the processes in each server are managed by a mapping table.

In the second embodiment described above, the server ID of the server on which a process is running is multiplexed by the number of per-server processes, the per-server process ID of the process is added to the result of the multiplication, and the result of the addition is used as the process ID of the process. The second embodiment is predicated on the assumption that each process ID may be regularly determined from the server ID and the per-server process ID. The process IDs may also be managed by the mapping table without any particular regularity given to assignments of the process IDs. In such a case, the source process and the destination process are determined with reference to the mapping table.

Figure 19:
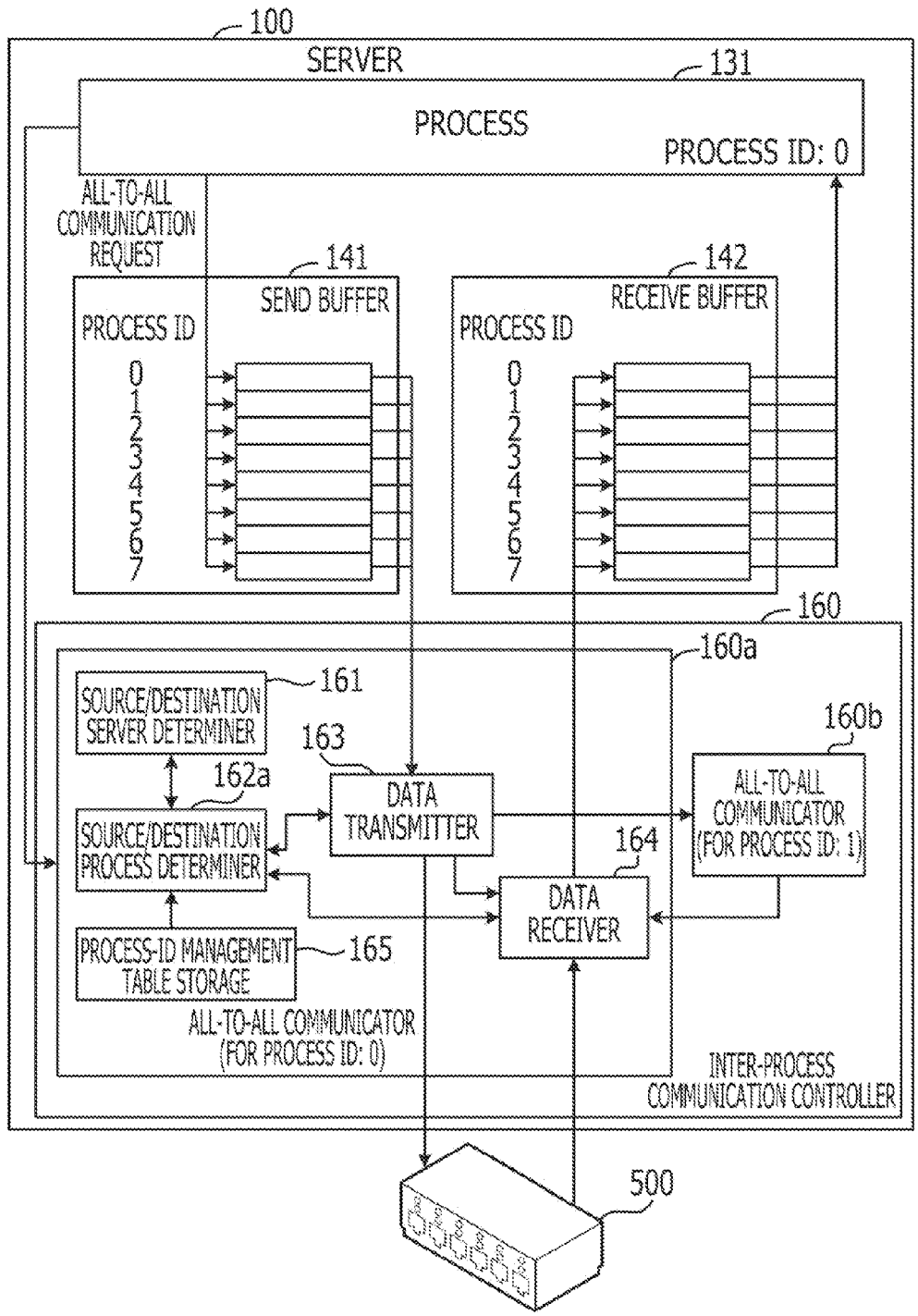
FIG. 19 is a block diagram of functions of a server according to a third embodiment.

FIG. 19 is a block diagram of functions of a server according to the third embodiment. Elements that are different between the third embodiment and the second embodiment are a source/destination process determiner 162a and a process-ID management table storage 165. The elements other than the source/destination process determiner 162a and the process-ID management table storage 165 are denoted by the same reference characters as those in the block diagram described above in the second embodiment with reference to FIG. 9, and descriptions thereof are abbreviated or omitted.

The source/destination process determiner 162a in the third embodiment and the source/destination process determiner 162 in the second embodiment are different from each other in details of the processing for deterring process IDs for a source process and a destination process. The source/destination process determiner 162a performs processing for exchanging various types of information with other elements in the same manner as the source/destination process determiner 162 in the second embodiment.

During determination of a source process, the source/destination process determiner 162a first determines a per-server process ID of a process that becomes a source process in a source server. The source/destination process determiner 162a then obtains, from the process-ID management table storage 165, a process ID corresponding to the determined per-server process ID. The source/destination process determiner 162a determines a process corresponding to the obtained process ID as the source process.

During determination of a destination process, the source/destination process determiner 162a first determines a per-server process ID of a process that becomes a destination process in a destination server. The source/destination process determiner 162a then obtains, from the process-ID management table storage 165, a process ID corresponding to the determined per-server process ID. The source/destination process determiner 162a determines the process corresponding to the obtained process ID as the destination process.

The process-ID management table storage 165 has a storage function for storing, in association with the process IDs, the server ID of servers executing processes that are assigned the process IDs and the per-server process IDs of the processes. For example, a part of a storage area of a RAM or HDD is used as the process-ID management table storage 165.

Figure 20:
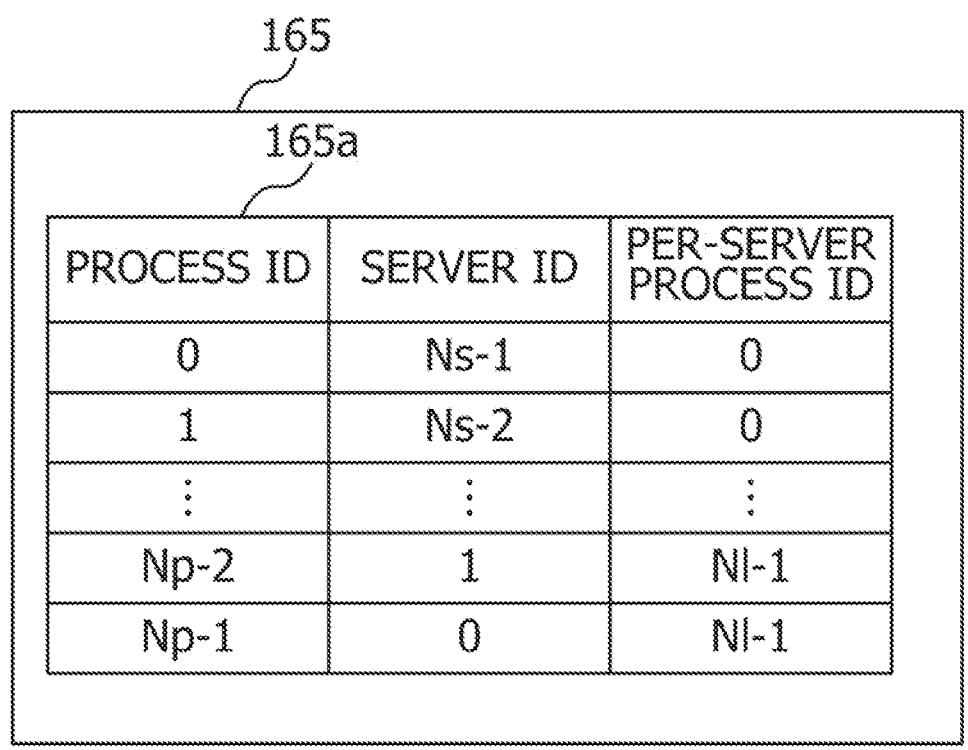
FIG. 20 illustrates an example of the data structure of a process-ID management table.

FIG. 20 illustrates an example of the data structure of the process-ID management table storage. The process-ID management table storage 165 stores the process-ID management table 165a. The process-ID management table 165a has columns for the process IDs, the server IDs, and the per-server process IDs.

A process ID for identifying each process in the cluster system is entered in the process-ID column. The server IDs of servers on which the processes assigned the process IDs are running are entered in the server-ID column. The per-server process IDs of the processes assigned the process IDs are entered in the per-server process ID column.

Figure 21:
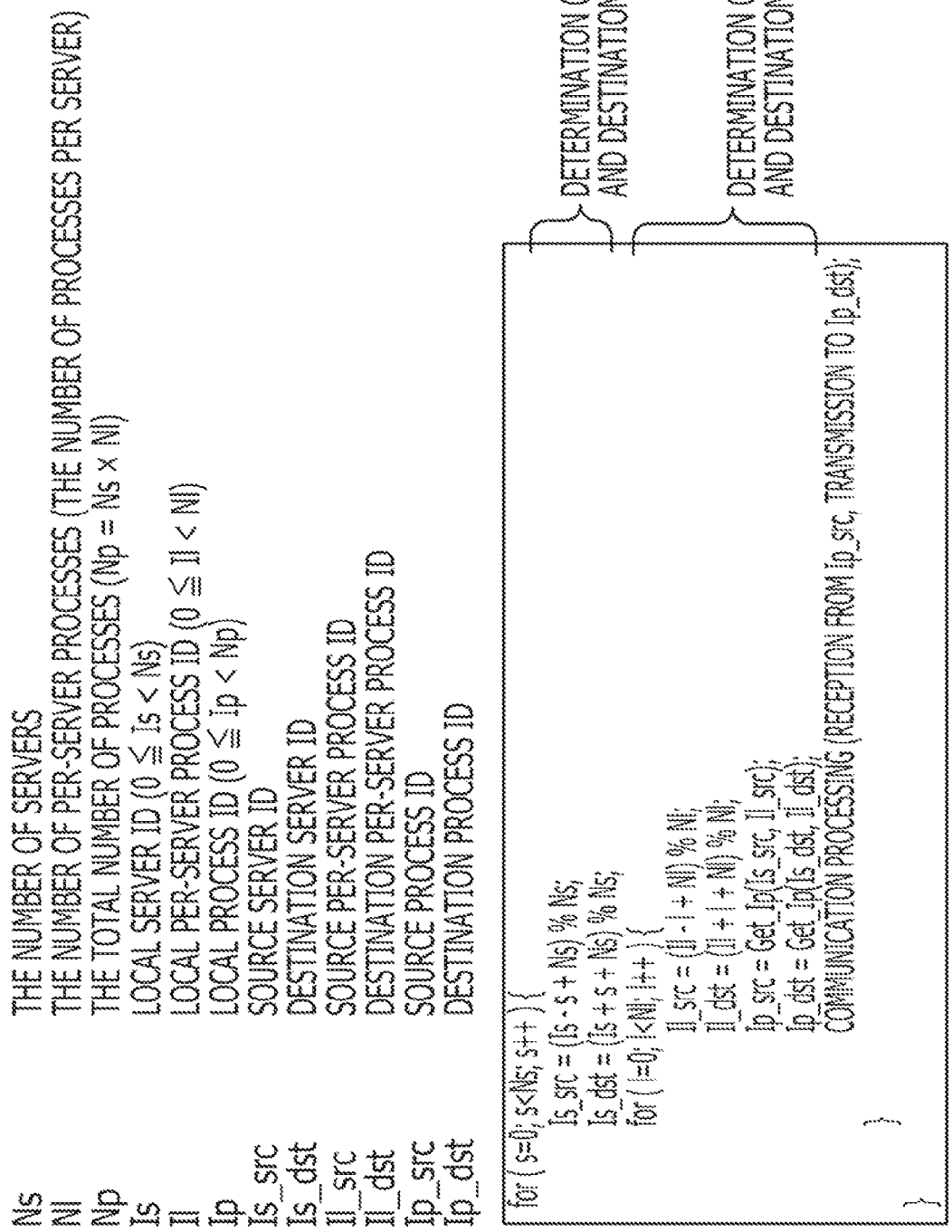
FIG. 21 illustrates an example of a processing description for making a process determination based on the 2-level ring algorithm according to the third embodiment.

FIG. 21 illustrates an example of a processing description for making a process determination based on the 2-level ring algorithm according to the third embodiment. As illustrated in FIG. 21, the processing for the 2-level ring algorithm according to the third embodiment may be written, for example, in a "for" statement. In FIG. 21, meanings given to variables, other than Ip, Il_src, and Il_dst, are the same as those in the second embodiment described above. In the third embodiment, Ip represents a local process ID, and the value thereof is an arbitrary value in the range of 0 to less than Np. Il_src represents the per-server process ID of a source process (a source per-server process ID). Il_dst represents the per-server process ID of a destination process (a destination per-server process ID).

The first to third lines in the processing description state a procedure for determining a source server and a destination server. The descriptions of the first to third lines are the same as those of the processing described above in the second embodiment with reference to FIG. 11.

The fourth line defines processing repeated with a "for" statement. Variable "l" is set to "0" as a default value. Each time the processing in the "for" statement is repeated once, the variable "l" is incremented (l++). When the value of the variable "l" is less than the number "Nl" of per-server processes, the processing from the fifth to ninth lines is repeated.

The fifth line defines an expression for determining a source per-server process ID. In the expression defined in the fifth line, the value of variable "l" is subtracted from the local per-server process ID "Il" and the number "Nl" of per-server processes is added to the resulting value, and the result of the subtraction and addition is divided by the number "Nl" of per-server processes. The remainder after the division is set for the source per-server process ID "Il_src".

The sixth line defines an expression for determining a destination per-server process ID. In the expression defined in the sixth line, the value of the variable "l" and the number "Nl" of per-server processes are added to the local per-server process ID "Il" and the result of the addition is divided by the number "Nl" of per-server processes. The remainder after the division is set for the destination per-server process ID "Il_dst".

The seventh line defines an expression for determining a source server. The expression defined in the seventh line summons a function Get_Ip( ) that specifies a source server ID "Is_src" and a source per-server process "Il_src" by using parameters. The function Get_Ip( ) represents processing for determining a process ID from a server ID and a per-server process ID by referring to the process-ID management table. A result of the processing represented by the function Get_Ip( ) is set for the source process ID "Ip_src".

The eighth line defines an expression for determining a destination process. The expression defined in the eighth line summons a function Get_Ip( ) that specifies a destination server ID "Is_dst" and a destination per-server process "Il_dst" by using parameters. A result of the processing represented by the function Get_Ip( ) is set for the destination process ID "Ip_dst".

The ninth line defines summoning a function for executing communication processing. In summoning the function for communication processing, the source process ID "Ip_src" is specified as the source from which data is to be received and the destination process ID "Is_dst" is specified as the destination to which data is to be transmitted.

Thus, when the process IDs are managed by the table, an appropriate process may be determined as a destination in accordance with the 2-level ring algorithm.

Other Application Examples

Although an example in which one server includes one dual-core processor has been described in the second embodiment, one server may also include a multi-core processor, such as a quad-core processor. Each server may also include a plurality of multi-core processors. For example, each server may include two quad-core processors. In such a case, the total number of cores is 8, so that eight processes are executed per server during parallel-program execution. When there are such a large number of processes per server, all-to-all communication based on the algorithm (the two-level ring algorithm) as in the second embodiment makes it possible to suppress the occurrence of HOL blocking in the network switch.

Moreover, even when one server includes a plurality of single-core processors, the server executes multiple processes. Even in such a case, all-to-all inter-process communication based on the 2-level ring algorithm makes it possible to improve the communication efficiency.

The functions of the above-described processing may be realized by a computer. In such a case, a program is provided in which the details of processing for the functions that may be included in the server are written. When the program is executed by the computer, the above-described processing functions may be achieved on the computer. The program in which the details of the processing are written may be recorded to computer-readable non-transitory medium. Examples of the computer-readable non-transitory medium include a magnetic storage device, an optical disk, a magneto-optical recording medium, and a semiconductor memory. Examples of the magnetic storage device include a HDD, a flexible disk (FD), and a magnetic tape. Examples of the optical disk include a DVD, DVD-RAM, and CD-ROM/RW. One example of the magneto-optical recording medium is an MO (magneto-optical) disk.

For distribution of the program, portable recording media (such as DVDs and CD-ROMs) on which the program is recorded may be made commercially available. The program may also be stored in a storage device in a server computer so that the program may be transferred from the server computer to another computer through a network.

A computer that executes the program may store, in the storage device thereof, the program recorded on the portable recording medium or the like or transferred from the server computer. The computer then reads the program from the storage device thereof to execute processing according to the program. The computer may also directly read the program from the portable recording medium to execute the processing according to the program. In addition, each time the program is transferred from the server computer, the computer may sequentially execute the processing according to the received program.

At least one of the above-described processing functions may also be implemented by an electronic circuit, such as a DSP (digital signal processor), an ASIC (application specific integrated circuit), or a PLD (programmable logic device).

Although the embodiments have been described above by way of example, the configuration of each element in the embodiments may be replaced with another element having the same or similar function. Any other element or process may also be added. Additionally, two or more given elements (or features) in the above-described embodiments may also be combined.

What is claimed is:

1. A computer for performing communication between processes executed by servers included in a cluster system, the computer being one of the servers, the computer comprising:
    a destination-server determination means for repeatedly determining, in response to an all-to-all inter-process communication request issued from a local process executed by the computer, a destination server in accordance with a destination-server determination procedure predefined so that, in a same round of destination-server determinations repeatedly performed by the respective servers during all-to-all inter-process communication, the servers determine servers that are different from one another as destination servers;

a destination-process determination means for repeatedly determining, each time the destination server is determined, a process running on the same determined destination server as a destination process; and a data transmission means for obtaining, each time the destination process is determined, transmission data for the destination process from a send buffer in which the transmission data is stored as a result of execution of the local process and transmitting the obtained transmission data to the destination server so as to enable reading of the transmission data during execution of the determined destination process in the destination server, wherein the destination-process determination means repeatedly determines a destination process for the local process that issued the all-to-all inter-process communication request, in accordance with a destination-process determination procedure predefined so that, in a same round of destination-process determinations repeatedly performed on the respective processes in response to an all-to-all inter-process communication request issued as a result of execution of the processes executed by the computer, the processes that are different from one another in the destination server are determined as the destination processes with respect to the respective processes, wherein, in accordance with the destination-process determination procedure, the destination-process determination means arranges process numbers assigned to the respective processes according to a predetermined sequence, and determines the destination process based on the sequence of a relative positional relationship between the process number assigned to the local process that issued the all-to-all inter-process communication request and the process number of another process, and wherein, in accordance with the destination-process determination procedure, the destination-process determination means arranges per-server process numbers, assigned to the respective processes in the destination server to uniquely identify the processes in the destination server, in ascending order to create a sequence in which a largest value of the per-server process numbers is followed by a smallest value of the per-server process numbers, sequentially locates a process number in a certain direction along the sequence from the process number assigned to the local process that issued the all-to-all inter-process communication request, and determines the process included in the destination server and indicated by the located process number as the destination process.

2. The computer according to claim 1, wherein, in accordance with the destination-server determination procedure, the destination-server determination means arranges server numbers assigned to the respective servers according to a predetermined sequence, and determines the destination server based on the sequence of a relative positional relationship between the server number assigned to the computer and another server number.

3. The computer according to claim 2, wherein, in accordance with the destination-server determination procedure, the destination-server determination means arranges the server numbers, assigned to the respective servers and included in the sequence, in ascending order such that a largest value of the server numbers is followed by a smallest value of the server numbers, sequentially locates a server number in a certain direction along the sequence from the server number assigned to the computer, and determines the server indicated by the located server number as the destination server.

4. The computer according to claim 1, further comprising:
a source-server determination means for repeatedly determining, in response to the all-to-all inter-process communication request from the local process executed by the computer, a source server in accordance with a source-server determination procedure predefined so that, in a same round of source-server determinations repeatedly performed by the respective servers during the all-to-all inter-process communication, the servers determine servers that are different from one another as source servers;

a source-process determination means for sequentially determining, each time the source server is determined, a process running on the determined source server as a source process; and a data reception means for obtaining, each time the source process is determined, reception data transmitted from the determined source process in the source server and storing the obtained reception data in a buffer for reception.

5. A computer for performing communication between processes executed by servers included in a cluster system, the computer being one of the servers, the computer comprising:
a memory configured to store a destination-server determination procedure predefined so that, in a same round of destination-server determinations repeatedly performed by the respective servers during all-to-all inter-process communication, the servers determine servers that are different from one another as destination servers; and a processor configured to execute a procedure, the procedure comprising,
repeatedly determining, in response to an all-to-all inter-process communication request from a local process executed by the computer, a destination server in accordance with the destination-server determination procedure read from the memory,
repeatedly determining, each time the destination server is determined, a process running on the same determined destination server as a destination process, and
obtaining, each time the destination process is determined, transmission data for the destination process from a send buffer in which the transmission data is stored as a result of execution of the local process and transmitting the obtained transmission data to the destination server so as to enable reading of the transmission data during execution of the determined destination process in the destination server,
wherein repeatedly determining a destination process for the local process that issued the all-to-all inter-process communication request, in accordance with a destination-process determination procedure predefined so that, in a same round of destination-process determinations repeatedly performed on the respective processes in response to an all-to-all inter-process communication request issued as a result of execution of the processes executed by the computer, the processes that are different from one another in the destination server are determined as the destination processes with respect to the respective processes, wherein, in accordance with the destination-process determination procedure, the destination-process determination procedure arranges process numbers assigned to the respective processes according to a predetermined sequence, and determines the destination process based on the sequence of a relative positional relationship between the process number assigned to the local process that issued the all-to-all inter-process communication request and the process number of another process, and wherein, in accordance with the destination-process determination procedure, the destination-process determination procedure arranges per-server process numbers, assigned to the respective processes in the destination server to uniquely identify the processes in the destination server, in ascending order to create a sequence in which a largest value of the per-server process numbers is followed by a smallest value of the per-server process numbers, sequentially locates a process number in a certain direction along the sequence from the process number assigned to the local process that issued the all-to-all inter-process communication request, and determines the process included in the destination server and indicated by the located process number as the destination process.

6. A computer-readable, non-transitory medium storing therein an inter-process communication program that causes a computer to execute a procedure, the inter-process communication program causing the computer to execute communication between processes executed by servers included in a cluster system, the computer being one of the servers, the procedure comprising:

repeatedly determining, in response to an all-to-all inter-process communication request from a local process executed by the computer, a destination server in accordance with a destination-server determination procedure predefined so that, in a same round of destination-server determinations repeatedly performed by the respective servers during all-to-all inter-process communication, the servers determine servers that are different from one another as destination servers;

repeatedly determining, each time the destination server is determined, a process running on the same determined destination server as a destination process; and obtaining, each time the destination process is determined, transmission data for the destination process from a send buffer in which the transmission data is stored as a result of execution of the local process and transmitting the obtained transmission data to the destination server so as to enable reading of the transmission data during execution of the determined destination process in the destination server, wherein repeatedly determining a destination process for the local process that issued the all-to-all inter-process communication request, in accordance with a destination-process determination procedure predefined so that, in a same round of destination-process determinations repeatedly performed on the respective processes in response to an all-to-all inter-process communication request issued as a result of execution of the processes executed by the computer, the processes that are different from one another in the destination server are determined as the destination processes with respect to the respective processes, wherein, in accordance with the destination-process determination procedure, the destination-process determination procedure arranges process numbers assigned to the respective processes according to a predetermined sequence, and determines the destination process based on the sequence of a relative positional relationship between the process number assigned to the local process that issued the all-to-all inter-process communication request and the process number of another process, and wherein, in accordance with the destination-process determination procedure, the destination-process determination procedure arranges per-server process numbers, assigned to the respective processes in the destination server to uniquely identify the processes in the destination server, in ascending order to create a sequence in which a largest value of the per-server process numbers is followed by a smallest value of the per-server process numbers, sequentially locates a process number in a certain direction along the sequence from the process number assigned to the local process that issued the all-to-all inter-process communication request, and determines the process included in the destination server and indicated by the located process number as the destination process.

7. An inter-process communication method for a computer to execute communication between processes executed by servers included in a cluster system, the computer being one of the servers, the method comprising:

repeatedly determining, in response to an all-to-all inter-process communication request from a local process executed by the computer, a destination server in accordance with a destination-server determination procedure predefined so that, in a same round of destination-server determinations repeatedly performed by the respective servers during all-to-all inter-process communication, the servers determine servers that are different from one another as destination servers;

repeatedly determining, each time the destination server is determined, a process running on the same determined destination server as a destination process; and obtaining, each time the destination process is determined, transmission data for the destination process from a send buffer in which the transmission data is stored as a result of execution of the local process and transmitting the obtained transmission data to the destination server so as to enable reading of the transmission data during execution of the determined destination process in the destination server, wherein repeatedly determining a destination process for the local process that issued the all-to-all inter-process communication request, in accordance with a destination-process determination procedure predefined so that, in a same round of destination-process determinations repeatedly performed on the respective processes in response to an all-to-all inter-process communication request issued as a result of execution of the processes executed by the computer, the processes that are different from one another in the destination server are determined as the destination processes with respect to the respective processes, wherein, in accordance with the destination-process determination procedure, the destination-process determination procedure arranges process numbers assigned to the respective processes according to a predetermined sequence, and determines the destination process based on the sequence of a relative positional relationship between the process number assigned to the local process that issued the all-to-all inter-process communication request and the process number of another process, and wherein, in accordance with the destination-process determination procedure, the destination-process determination procedure arranges per-server process numbers, assigned to the respective processes in the destination server to uniquely identify the processes in the destination server, in ascending order to create a sequence in which a largest value of the per-server process numbers is followed by a smallest value of the per-server process numbers, sequentially locates a process number in a certain direction along the sequence from the process number assigned to the local process that issued the all-to-all inter-process communication request, and determines the process included in the destination server and indicated by the located process number as the destination process.

* * * * *